United States Patent
Ito et al.

(10) Patent No.: US 12,311,775 B2
(45) Date of Patent: May 27, 2025

(54) METHOD FOR CONTROLLING ELECTRIC VEHICLE AND DEVICE FOR CONTROLLING ELECTRIC VEHICLE

(71) Applicant: NISSAN MOTOR CO., LTD., Yokohama (JP)

(72) Inventors: Yui Ito, Kanagawa (JP); Akira Sawada, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/848,032

(22) PCT Filed: Mar. 18, 2022

(86) PCT No.: PCT/JP2022/012923
§ 371 (c)(1),
(2) Date: Sep. 17, 2024

(87) PCT Pub. No.: WO2023/175993
PCT Pub. Date: Sep. 21, 2023

(65) Prior Publication Data
US 2025/0115135 A1    Apr. 10, 2025

(51) Int. Cl.
*B60L 15/20*    (2006.01)

(52) U.S. Cl.
CPC ........... *B60L 15/20* (2013.01); *B60L 2240/12* (2013.01); *B60L 2240/423* (2013.01)

(58) Field of Classification Search
CPC . B60L 15/20; B60L 2240/12; B60L 2240/423
See application file for complete search history.

(56) References Cited

U.S. PATENT DOCUMENTS 9,845,022 B2 * 12/2017 Komatsu ............. B60L 15/2018
10,266,069 B2 *  4/2019 Sawada ................... B60L 15/20
(Continued)

FOREIGN PATENT DOCUMENTS

CN    113631416 A    11/2021
JP    2011-217516 A    10/2011
(Continued)

OTHER PUBLICATIONS

Yang et al., Current distribution control of dual direct-driven wheel motors for electric vehicle, IEEE, 2006, p. 2469-2474 (Year: 2006).*

(Continued)

*Primary Examiner* — McDieunel Marc
(74) *Attorney, Agent, or Firm* — Foley & Lardner LLP

(57) ABSTRACT

A method for controlling an electric vehicle including a plurality of driving wheels and a plurality of electric motors that generate driving forces respectively for the plurality of driving wheels, the method including: estimating a vehicle body speed for each of the driving wheels based on a rotation speed of each of the electric motors; estimating, for each of the driving wheels, a driving wheel disturbance torque, which is a disturbance torque acting on the driving wheel, based on the vehicle body speed estimated for each of the driving wheels; estimating a vehicle disturbance torque, which is an actual disturbance torque acting on the entire electric vehicle, based on the driving wheel disturbance torque estimated for each of the driving wheels; and controlling a torque to be output by each of the plurality of electric motors based on the vehicle disturbance torque.

9 Claims, 9 Drawing Sheets

(56) References Cited

U.S. PATENT DOCUMENTS

| | | | |
|---|---|---|---|
| 2016/0221468 A1* | 8/2016 | Suzuki | B60L 3/106 |
| 2016/0297321 A1* | 10/2016 | Komatsu | B60L 15/2018 |
| 2018/0043792 A1* | 2/2018 | Sawada | B60W 30/18127 |
| 2018/0290664 A1* | 10/2018 | Suzuki | B60L 15/20 |
| 2022/0185121 A1 | 6/2022 | Sawada et al. | |
| 2024/0270086 A1* | 8/2024 | Sawada | B60L 15/20 |

FOREIGN PATENT DOCUMENTS

| | | |
|---|---|---|
| JP | 2015-220912 A | 12/2015 |
| JP | 2019-022339 A | 2/2019 |
| JP | 2020-010454 A | 1/2020 |
| JP | 2020-162373 A | 10/2020 |

OTHER PUBLICATIONS

Hori, Future vehicle driven by electricity and control-research on four wheel motored "UOT Electric March II", IEEE, 2006, p. 1-14 (Year: 2002).*

Hori, Future vehicle driven by electricity and Control-research on four-wheel-motored "UOT electric march II", IEEE, 2004, p. 1-9 (Year: 2004).*

Yin et al., Design of electric differential system for an electric vehicle with dual wheel motors, IEEE, 2008, p. 2764-2769 (Year: 2008).*

* cited by examiner

METHOD FOR CONTROLLING ELECTRIC VEHICLE AND DEVICE FOR CONTROLLING ELECTRIC VEHICLE

TECHNICAL FIELD

The present invention relates to a method for controlling an electric vehicle and a device for controlling an electric vehicle.

BACKGROUND ART

JP2019-022339A discloses a motor control device that stops an electric vehicle by a driving force generated by a driving electric motor (hereinafter, simply referred to as a motor). Specifically, a disturbance torque acting on a motor is estimated, and an output torque of the motor is controlled so as to coincide with the estimated disturbance torque just before stop of the vehicle.

SUMMARY OF INVENTION

In an electric vehicle, a plurality of electric motors may be used in combination for driving. Therefore, in the electric vehicle using the plurality of motors, it may be difficult to accurately estimate a disturbance torque. For example, when there is a difference between wheel loads of a plurality of driving wheels to which the electric motors are connected due to a road surface gradient or the like, a non-negligible error may be superimposed on the estimated disturbance torque. Therefore, in the electric vehicle using the plurality of motors in combination, the disturbance torque cannot be accurately estimated, and as a result, the electric vehicle may not be accurately controlled.

An object of the present invention is to provide a method for controlling an electric vehicle and a device for controlling an electric vehicle capable of accurately estimating a disturbance torque and accurately controlling the electric vehicle when a plurality of motors are provided for driving.

An aspect of the present invention is a method for controlling an electric vehicle including a plurality of driving wheels and a plurality of electric motors that generate driving forces respectively for the plurality of driving wheels. In the method for controlling, a vehicle body speed is estimated for each of the driving wheels based on the rotation speed of the electric motor. For each of the driving wheels, a driving wheel disturbance torque, which is a disturbance torque acting on the driving wheel, is estimated based on the vehicle body speed estimated for each of driving wheels. Then, a vehicle disturbance torque, which is a real disturbance torque acting on the entire electric vehicle, is estimated based on the driving wheel disturbance torque estimated for each driving wheel, and a torque to be output by each of the plurality of electric motors is controlled based on the vehicle disturbance torque.

DESCRIPTION OF EMBODIMENTS

An embodiment of the present invention will be described below with reference to the drawings.

EMBODIMENT

Figure 1:
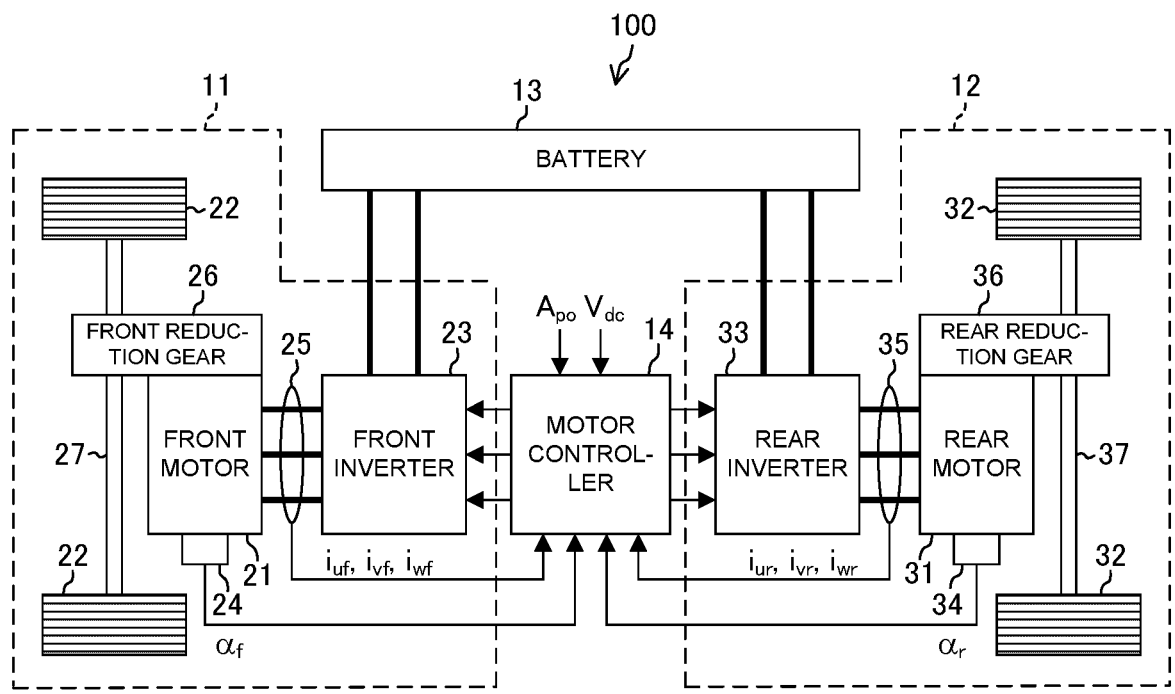
FIG. 1 is a block diagram showing a configuration of an electric vehicle.

FIG. 1 is a block diagram showing a configuration of an electric vehicle 100. The electric vehicle 100 is an electric vehicle including a plurality of driving wheels and a plurality of electric motors that generate a driving force in each of the plurality of driving wheels. In the present embodiment, the electric vehicle 100 is a so-called four-wheel-drive vehicle, and includes front wheels 22 and rear wheels 32 which are driving wheels, and a front motor 21 and a rear motor 31 which generate a driving force in each of the driving wheels.

As shown in FIG. 1, the electric vehicle 100 includes a front drive system 11, a rear drive system 12, a battery 13, and a motor controller 14.

The front drive system 11 is a system that drives the front wheels 22 by the front motor 21. The front drive system 11 includes a front inverter 23, a rotation sensor 24, a current sensor 25, and the like in addition to the front motor 21 and the front wheels 22.

The front motor 21 is, for example, a three-phase AC synchronous electric motor, and is driven by AC power input from the front inverter 23. An output torque of the front motor 21 generates a torque (driving force) in the front wheels 22. The front motor 21 generates a so-called regenerative torque when a drive shaft thereof is rotated by the front wheels 22. Therefore, the front motor 21 can recover kinetic energy of the electric vehicle 100 as electric energy.

The front wheels 22 are a pair of driving wheels disposed at a front side of the electric vehicle 100. The front wheels 22 are connected to the front motor 21 via a front reduction gear 26 and a drive shaft 27. In the present embodiment, the front wheels 22 include a right front wheel and a left front wheel. However, since the right front wheel and the left front wheel are coupled by the drive shaft 27 and are integrally driven, in the present embodiment, the right front wheel and the left front wheel are not distinguished from each other, and are collectively referred to as the front wheels 22. The front wheels 22 are first driving wheels in comparison with the rear wheels 32 which are other driving wheels.

The front inverter 23 includes two pairs of switching elements for each phase of the front motor 21. The front inverter 23 turns on and off these switching elements according to a pulse width modulation (PWM) signal input from the motor controller 14. Accordingly, the front inverter 23 converts DC power supplied from the battery 13 into AC power, inputs the AC power to the front motor 21 to drive the front motor 21. The switching elements constituting the front inverter 23 are, for example, power semiconductor elements such as insulated gate bipolar transistors (IGBT) or metal oxide film semiconductor field-effect transistors (MOS-FET). During regenerative control, the front inverter 23 converts AC power generated by the front motor 21 into DC power and inputs the DC power to the battery 13.

The rotation sensor 24 detects a rotor phase $\alpha_f$ of the front motor 21. The rotor phase $\alpha_f$ is a so-called electric angle [rad]. The rotation sensor 24 is, for example, a resolver or an encoder. The detected rotor phase $\alpha_f$ is input to the motor controller 14.

The current sensor 25 detects currents $i_{uf}$, $i_{vf}$, $i_{wf}$ flowing through the respective phases of the front motor 21 (hereinafter referred to as currents of three phases). The currents $i_{uf}$, $i_{vf}$, $i_{wf}$ of three phases of the front motor 21 are input to the motor controller 14.

The rear drive system 12 is a system that drives the rear wheels 32 by the rear motor 31, and is configured symmetrically to the front drive system 11. Therefore, in addition to the rear motor 31 and the rear wheels 32, the rear drive system 12 includes a rear inverter 33, a rotation sensor 34, a current sensor 35, a rear reduction gear 36, and a drive shaft 37. These units of the rear drive system 12 function in the same manner as the units of the front drive system 11. That is, the rear wheels 32 are a pair of driving wheels disposed at a rear side of the electric vehicle 10. The rear wheels 32 include a right rear wheel and a left rear wheel, but in the present embodiment, the right rear wheel and the left rear wheel are not distinguished from each other, and are collectively referred to as the rear wheels 32. The rear wheels 32 are second driving wheels in comparison with the front wheels 22 which are other driving wheels. A rotor phase of the rear drive system 12 detected by the rotation sensor 34 is "$\alpha_r$". The currents flowing through the respective phases of the rear motor 31 detected by the current sensor 35 are "$i_{ur}$, $i_{vr}$, $i_{wr}$".

The battery 13 is provided in common in the front drive system 11 and the rear drive system 12, and supplies electric power for driving the front motor 21 and the rear motor 31. During regenerative control, the battery 13 is charged with regenerative power generated by the front motor 21 and the rear motor 31.

The motor controller 14 is a device for controlling the electric vehicle 100. The motor controller 14 is implemented by, for example, one or more computers including a central processing unit (CPU), a read-only memory (ROM), a random access memory (RAM), an input/output interface (I/O interface), and the like. The motor controller 14 is programmed to control the front motor 21, the rear motor 31, and the like at a predetermined control cycle. For example, the motor controller 14 acquires various vehicle variables and generates PWM signals for driving the front motor 21 and the rear motor 31 based on these vehicle variables. Then, the motor controller 14 drives the front motor 21 and the rear motor 31 according to the vehicle variables by inputting the generated PWM signals to the front inverter 23 and the rear inverter 33.

The vehicle variables are parameters representing a control state and the like of the electric vehicle 10. The motor controller 14 acquires, as the vehicle variables, for example, the rotor phase $\alpha_f$ and the currents $i_{uf}$, $i_{vf}$, $i_{wf}$ of three phases of the front motor 21, and the rotor phase $\alpha_r$ and the currents $i_{ur}$, $i_{vr}$, $i_{wr}$ of three phases of the rear motor 31. In addition, the motor controller 14 acquires, for example, an accelerator opening $A_{po}$ and a DC voltage $V_{dc}$ of the battery 13 as the vehicle variables. The accelerator opening $A_{po}$ is a parameter representing an operation amount on an accelerator pedal by a driver. The vehicle variables such as the accelerator opening $A_{po}$ and the DC voltage $V_{dc}$ of the battery 13 can be appropriately detected as necessary using, for example, sensors (not shown). Note that the motor controller 14 of the present embodiment directly acquires the vehicle variables from sensors or the like, but the motor controller 14 can acquire some or all of the vehicle variables from the other controller (computer) (not shown).

In the electric vehicle 100 configured as described above, the motor controller 14 estimates a disturbance torque which is a torque generated by disturbance. Then, the motor controller 14 controls operation of the electric vehicle 100 by controlling torques to be output by each of the front motor 21 and the rear motor 31 based on the estimated disturbance torque. Hereinafter, as an example, an example in which the estimated disturbance torque is used for distribution of driving forces to the front wheels 22 and the rear wheels 32 and stop control of the electric vehicle 100 will be described in detail.

Figure 2:
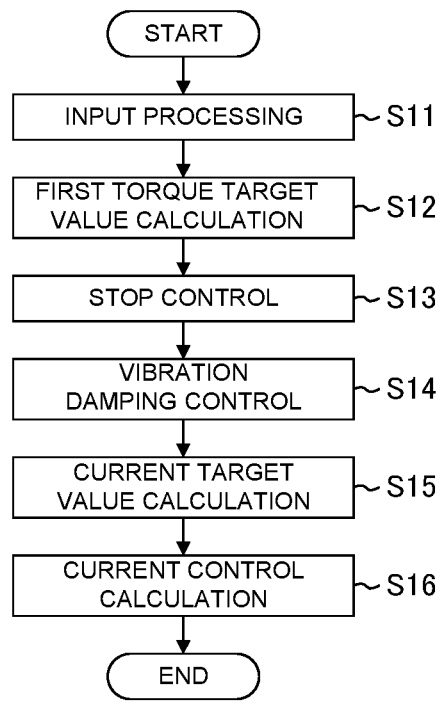
FIG. 2 is a flowchart showing control executed by a motor controller.

FIG. 2 is a flowchart showing control executed by the motor controller 14. As shown in FIG. 2, the motor controller 14 executes input processing S11, first torque target value calculation S12, stop control S13, vibration damping control S14, current target value calculation S15, current control calculation S16, and the like. That is, the motor controller 14 is programmed to function as an input processing unit that executes the input processing S11, a first torque target value calculation unit that executes the first torque target value calculation S12, a stop control unit that executes the stop control S13, and a vibration damping control unit that executes the vibration damping control S14. The motor controller 14 is programmed to function as a current target value calculation unit that executes the current target value calculation S15, a current control calculation unit that executes the current control calculation S16, and the like.

The input processing S11 is processing of acquiring or calculating vehicle variables and the like necessary for controlling the front motor 21 and the rear motor 31.

Specifically, in the input processing S11, the motor controller 14 acquires the currents $i_{uf}$, $i_{vf}$, $i_{wf}$ of three phases of the front motor 21 and the currents $i_{ur}$, $i_{vr}$, $i_{wr}$ of three phases of the rear motor 31. Since a sum of the currents $i_{uf}$, $i_{vf}$, $i_{wf}$ of three phases of the front motor 21 is zero, the motor controller 14 can, for example, acquire the currents of two phases, and calculate the current of the remaining one phase. The same applies to the currents $i_{ur}$, $i_{vr}$, $i_{wr}$ of three phases of the rear motor 31.

In addition, in the input processing S11, the motor controller 14 acquires the rotor phase $\alpha_f$ of the front motor 21, the rotor phase $\alpha_r$ of the rear motor 31, and the DC voltage $V_{dc}$ of the battery 13.

In the input processing S11, the motor controller 14 calculates, for example, a rotation angular velocity $\omega_{mf}$ [rad/s] of the front motor 21 and a rotation angular velocity $\omega_{mr}$ [rad/s] of the rear motor 31. The rotation angular velocity $\omega_{mf}$ of the front motor 21 is a mechanical angular velocity, and is calculated by differentiating the rotor phase $\alpha_f$ and dividing the differentiating result by the number of pole pairs of the front motor 21. Similarly, the rotation angular velocity $\omega_{mr}$ of the rear motor 31 is a mechanical angular velocity, and is calculated by differentiating the rotor phase $\alpha_r$, and dividing the differentiating result by the number of pole pairs of the rear motor 31.

Note that in the present embodiment, the rotation angular velocity $\omega_{mf}$ of the front motor 21 and the rotation angular velocity $\omega_{mr}$ of the rear motor 31 are used as parameters representing the rotation speeds of the electric motors of the electric vehicle 100. However, for example, a rotation speed $N_{mf}$ [rpm] of the front motor 21 and a rotation speed $N_{mr}$ [rpm] of the rear motor 31 may also be used as parameters representing the rotation speeds of the electric motors. The rotation speed $N_{mf}$ of the front motor 21 and the rotation speed $N_{mr}$ of the rear motor 31 can be calculated by multiplying the rotation angular velocity $\omega_{mf}$ of the front motor 21 and the rotation angular velocity $\omega_{mr}$ of the rear motor 31 by a unit conversion coefficient (60/2 $\pi$), respectively.

The first torque target value calculation S12 is processing of calculating a target value (hereinafter, referred to as a first torque target value $T_{m1}^*$) for a torque to be output by the front motor 21 and the rear motor 31 as a whole according to the operation of the driver. In the present embodiment, the motor controller 14 calculates the first torque target value $T_{m1}^*$ based on the accelerator opening $A_{po}$ and the rotation angular velocity $\omega_{mf}$ of the front motor 21.

Figure 3:
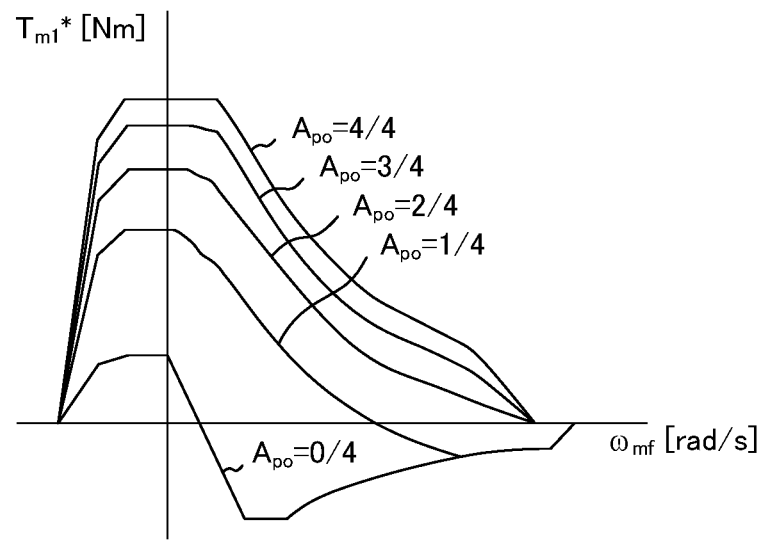
FIG. 3 is a graph showing an example of an accelerator opening-torque table.

FIG. 3 is a graph showing an example of an accelerator opening-torque table. As shown in FIG. 3, for example, the motor controller 14 holds in advance the accelerator opening-torque table in which the accelerator opening $A_{po}$ and the rotation angular velocity $\omega_{mf}$ are associated with the first torque target value $T_{m1}^*$ through experiments, simulations, or the like. Therefore, the motor controller 14 refers to the accelerator opening-torque table to calculate the first torque target value $T_{m1}^*$ corresponding to the accelerator opening $A_{po}$ and the rotation angular velocity $\omega_{mf}$.

In a normal traveling state in which the stop control S13 is not executed, the first torque target value $T_{m1}^*$ is distributed to a front torque command value $T_{mf1}^*$ and a rear torque command value $T_{mr1}^*$. The front torque command value $T_{mf1}^*$ is a command value representing a target of a torque to be output by the front motor 21. The rear torque command value $T_{mr1}^*$ is a command value representing a target of a torque to be output by the rear motor 31. A distribution ratio $K_{f3}$ of the first torque target value $T_{m1}^*$ to the front torque command value $T_{mf1}^*$ and the rear torque command value $T_{mr1}^*$ is adjusted according to a "vehicle disturbance torque $T_d$" which is a real disturbance torque acting on the entire electric vehicle 100. Details of the distribution of the first torque target value $T_{m1}^*$ according to the vehicle disturbance torque $T_d$ will be described later together with details of the stop control S13.

The stop control S13 (see FIG. 2) is control for stopping the electric vehicle 100 and maintaining the stop state using the front motor 21, or the rear motor 31, or both. Specifically, the motor controller 14 determines whether the electric vehicle 100 is just before stop. When it is determined that the electric vehicle 100 is just before stop, the motor controller 14 executes the stop control S13. The motor controller 14 estimates the vehicle disturbance torque $T_d$, and calculates the second torque target value $T_{m2}^*$ set based on the estimated vehicle disturbance torque $T_d$. When the stop control S13 is executed, the motor controller 14 distributes the second torque target value $T_{m2}^*$ to the front torque command value $T_{mf1}$ and the rear torque command value $T_{mr1}^*$. Accordingly, the motor controller 14 stops the electric vehicle 100 by controlling the front motor 21 and/or the rear motor 31 regardless of inclination of a road surface or the like, and maintains the stop state. The distribution ratio of the second torque target value $T_{m2}^*$ to the front torque command value $T_{mf1}^*$ and the rear torque command value $T_{mr1}^*$ is adjusted according to the vehicle disturbance torque Ta. The stop control S13 will be described in detail later.

The vibration damping control S14 is processing of suppressing vibration occurring in a driving force transmission system. In the vibration damping control S14, the motor controller 14 calculates a final torque command value for the front motor 21 (hereinafter, referred to as a front final torque command value $T_{mff}^*$) based on the front torque command value $T_{mf1}^*$. The front final torque command value $T_{mff}^*$ causes the front motor 21 to output a required torque while suppressing torsional vibration and the like of the drive shaft 27. Similarly, in the vibration damping control S14, the motor controller 14 calculates a final torque command value for the rear motor 31 (hereinafter, referred to as a rear final torque command value $T_{mrf}^*$) based on the rear torque command value $T_{mr1}^*$. The rear final torque command value $T_{mrf}^*$ causes the rear motor 31 to output a required torque while suppressing torsional vibration and the like of the drive shaft 37. Details of the vibration damping control S14 will be described later.

The current target value calculation S15 is processing of calculating a target value of a current input to the front motor 21 and the rear motor 31 (hereinafter, referred to as a current target value). The motor controller 14 calculates the current target value in a so-called dq-axis coordinate system. Specifically, the motor controller 14 calculates a dq-axis current target value $i_{df}^*$, $i_{qf}^*$ of the front motor 21 based on the front final torque command value $T_{mff}^*$, the rotation angular velocity $\omega_{mf}$ of the front motor 21, and the DC voltage $V_{dc}$ of the battery 13. Similarly, the motor controller 14 calculates a dq-axis current target value $i_{dr}^*$, $i_{qr}^*$ of the rear motor 31 based on the rear final torque command value $T_{mrf}^*$, the rotation angular velocity $\omega_{mr}$ of the rear motor 31, and the DC voltage $V_{dc}$ of the battery 13.

Note that the motor controller 14 holds in advance a table in which the front final torque command value $T_{mff}^*$, the rotation angular velocity $\omega_{mf}$ of the front motor 21, and the DC voltage $V_{dc}$ of the battery 13 are associated with the dq-axis current target value $i_{df}^*$, $i_{qf}^*$ of the front motor 21 through experiments, simulations, or the like. Similarly, the motor controller 14 holds in advance a table in which the rear final torque command value $T_{mrf}^*$, the rotation angular velocity $\omega_{mr}$ of the rear motor 31, and the DC voltage $V_{dc}$ of the battery 13 are associated with the dq-axis current target values $i_{dr}^*$, $i_{qr}^*$ of the rear motor 31 through experiments, simulations, or the like. Therefore, the motor controller 14 refers to these tables to calculate the dq-axis current target value $i_{df}^*$, $i_{qf}^*$ of the front motor 21 and the dq-axis current target value $i_{dr}^*$, $i_{qr}^*$ of the rear motor 31.

The current control calculation S16 is processing of calculating PWM signals for driving the front motor 21 and the rear motor 31. The motor controller 14 calculates the PWM signal for driving the front motor 21 as follows. First, the motor controller 14 calculates a dq-axis current $i_{df}$, $i_{qf}$ based on the currents $i_{uf}$, $i_{vf}$, $i_{wf}$ of three phases and the rotor phase $\alpha_f$. Next, the motor controller 14 calculates a dq-axis voltage command value $v_{df}$, $v_{qf}$ based on a deviation between the dq-axis current target value $i_{df}^*$, $i_{qf}^*$ and the dq-axis current $i_{df}$, $i_{qf}$. In this case, the motor controller 14 may add so-called non-interference control. The motor controller 14 calculates voltage command values $v_{uf}$, $v_{vf}$, $v_{wf}$ of three phases based on the dq-axis voltage command value $v_{df}$, $v_{qf}$ and the rotor phase $\alpha_f$. Then, the motor controller 14 calculates the PWM signal based on the voltage command values $v_{uf}$, $v_{vf}$, $v_{wf}$ of three phases and the DC voltage $V_{dc}$ of the battery 13. By turning on and off the switching elements of the front inverter 23 according to the PWM signal calculated in this manner, the front motor 21 is driven to output a required torque. The calculation of the PWM signal for driving the front motor 21 has been described above, and the same applies to the calculation of the PWM signal for driving the rear motor 31.

Hereinafter, the stop control S13, the distribution of the first torque target value $T_{m1}^*$, and the vibration damping control S14 will be described in detail.

<Vehicle Model of Electric Vehicle>

The stop control S13 and the vibration damping control S14 are executed based on a vehicle model of the electric vehicle 100. Specifically, in the stop control S13, a transmission characteristic $G_{\omega fV}(s)$ and a transmission characteristic $G_{\omega rV}(s)$ based on the vehicle model of the electric vehicle 100 described below are used. The transmission characteristic $G_{\omega fV}(s)$ is a transmission characteristic from the rotation angular velocity $\omega_{mf}$ of the front motor 21 to the vehicle body speed. The transmission characteristic $G_{\omega rV}(s)$ is a transmission characteristic from the rotation angular velocity $\omega_{mr}$ of the rear motor 31 to the vehicle body speed.

In the vibration damping control S14, a transmission characteristic $G_{pff}(s)$, a transmission characteristic $G_{rff}(s)/G_{pff}(s)$, a transmission characteristic $G_{prr}(s)$, and a transmission characteristic $G_{rrr}(s)/G_{prr}(s)$ based on the vehicle model of the electric vehicle 100 are used. The transmission characteristic $G_{pff}(s)$ is a transmission characteristic from the torque output by the front motor 21 (hereinafter, referred to as a front motor torque $T_{mf}$) to the rotation angular velocity $\omega_{mf}$ of the front motor 21. The transmission characteristic $G_{rff}(s)/G_{pff}(s)$ is a transmission characteristic of a feedforward compensator that suppresses torsional vibration of the drive shaft 27 in the front drive system 11. The transmission characteristic $G_{prr}(s)$ is a transmission characteristic from the torque output by the rear motor 31 (hereinafter, referred to as a rear motor torque $T_{mr}$) to the rotation angular velocity $\omega_{mr}$ of the rear motor 31. A transmission characteristic $G_{rrr}(s)/G_{prr}(s)$ is a transmission characteristic of a feedforward compensator that suppresses torsional vibration of the drive shaft 37 in the rear drive system 12.

Here, before detailed description of the stop control S13 and the vibration damping control S14, the vehicle model of the electric vehicle 100, equations of motion thereof, and transmission characteristics used in the vibration damping control S14 will be described. The transmission characteristics used in the stop control S13 will be described in detail in the description of the stop control S13.

Figure 4:
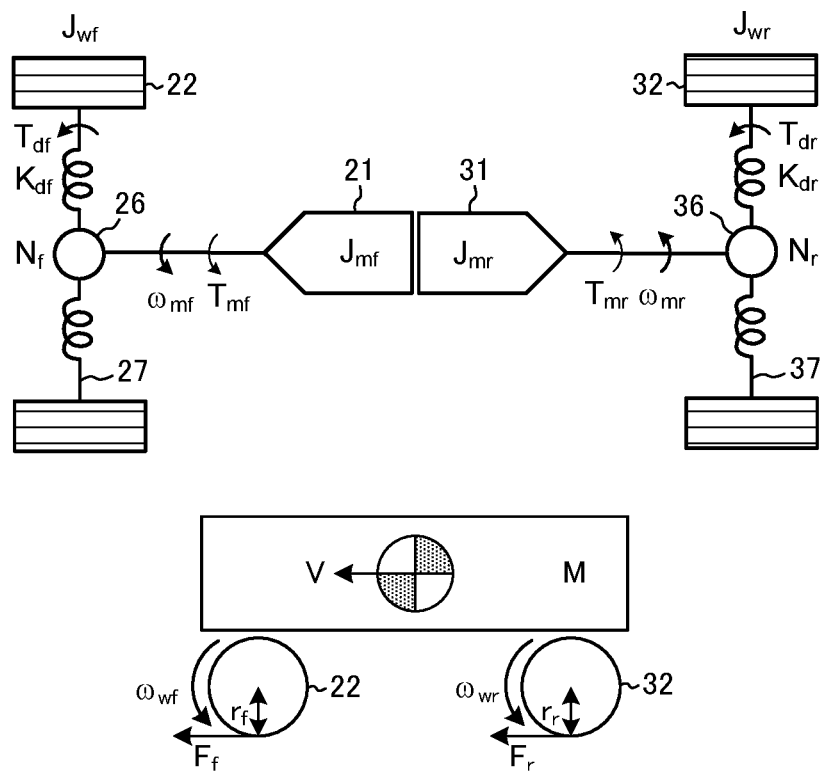
FIG. 4 is an explanatory diagram showing parameters used in equations of motion of the electric vehicle.

FIG. 4 is an explanatory diagram showing parameters used in the equations of motion of the electric vehicle 100. When the driving force transmission system of the electric vehicle 100 is modeled as shown in FIG. 4, the equations of motion of the electric vehicle 100 are expressed by the following equations (1) to (11).

[Math. 1]

$$J_{mf} \cdot \dot{\omega}_{mf} = T_{mf} - T_{df}/N_f \tag{1}$$

$$J_{mr} \cdot \dot{\omega}_{mr} = T_{mr} - T_{dr}/N_r \tag{2}$$

-continued $$2J_{wf} \cdot \dot{\omega}_{wf} = T_{df} - r_f F_f \tag{3}$$

$$2J_{wr} \cdot \dot{\omega}_{wr} = T_{dr} - r_r F_r \tag{4}$$

$$M \cdot \dot{V} = F_f + F_r \tag{5}$$

$$T_{df} = K_{df} \cdot \theta_{df} \tag{6}$$

$$T_{dr} = K_{dr} \cdot \theta_{dr} \tag{7}$$

$$F_f = K_{tf} \cdot (r_f \omega_{mf} - V) \tag{8}$$

$$F_r = K_{tr} \cdot (r_r \omega_{mr} - V) \tag{9}$$

$$\theta_{df} = \theta_{mf}/N_f - \theta_{wf} \tag{10}$$

$$\theta_{dr} = \theta_{mr}/N_r - \theta_{wr} \tag{11}$$

Parameters shown in FIG. 4 and the above equations of motion are as follows. The "f" at the end of the auxiliary symbol (subscript) of each parameter indicates the front, and "r" indicates the rear. In the above (1) to (5), the symbol "." shown above the parameters represents time differentiation, and in the above (1) to (9), the symbol "·" shown between the parameters represents a product.

$J_{mf}$, $J_{mr}$: motor inertia
$J_{wf}$, $J_{wr}$: drive shaft inertia (for one shaft)
$K_{df}$, $K_{dr}$: torsional rigidity of drive shaft
$K_{tf}$, $K_{tr}$: coefficient relating to friction between tire and road surface
$N_f$, $N_r$: over-all gear ratio
$r_f$, $r_r$: tire load radius
$\omega_{mf}$, $\omega_{mr}$: motor rotation angular velocity
$\theta_{mf}$, $\theta_{mr}$: motor angle
$\omega_{wf}$, $\omega_{wr}$: driving wheel angular velocity
$\theta_{wf}$, $\theta_{wr}$: driving wheel angle
$T_{mf}$, $T_{mr}$: motor torque
$T_{df}$, $T_{dr}$: drive shaft torque
$F_f$, $F_r$: driving force (for two shafts)
V: vehicle body speed
M: vehicle mass The transmission characteristic $G_{pff}(s)$ from the front motor torque $T_{mf}$ to the rotation angular velocity $\omega_{mf}$ of the front motor 21 is obtained by performing the Laplace transform on the equations (1) to (11), and is expressed by the equations (12) and (13) below. The coefficients $b_0$ to $b_6$ and the coefficients $a_0$ to $a_6$ in the equation (13) are expressed by the following equations (14) and (15), respectively. Then, the parameters $x_{11}$ to $x_{24}$ and the parameters $\delta_{11}$ to $\delta_{44}$ used in the coefficients $b_0$ to $b_6$ and the coefficients $a_0$ to $a_6$ are expressed by the following equations (16) and (17), respectively.

[Math. 2]

$$\omega_{mf} = G_{pff}(s) \cdot T_{mf} \tag{12}$$

$$G_{pff}(s) = \frac{1}{s} \cdot \frac{b_6 s^6 + b_5 s^5 + b_4 s^4 + b_3 s^3 + b_2 s^2 + b_1 s + b_0}{a_6 s^6 + a_5 s^5 + a_4 s^4 + a_3 s^3 + a_2 s^2 + a_1 s + a_0} \tag{13}$$

[Math. 3]

$$\begin{cases} b_6 = \chi_{21}\delta_{21} \\ b_5 = \chi_{11}\delta_{11} + \chi_{21}\delta_{22} + \chi_{22}\delta_{21} \\ b_4 = \chi_{11}\delta_{12} + \chi_{21}\delta_{23} + \chi_{22}\delta_{22} + \chi_{23}\delta_{21} \\ b_3 = \chi_{11}\delta_{13} + \chi_{12}\delta_{11} + \chi_{22}\delta_{23} + \chi_{23}\delta_{22} + \chi_{24}\delta_{21} \\ b_2 = \chi_{11}\delta_{14} + \chi_{12}\delta_{12} + \chi_{23}\delta_{23} + \chi_{24}\delta_{22} \\ b_1 = \chi_{12}\delta_{13} + \chi_{24}\delta_{23} \\ b_0 = \chi_{12}\delta_{14} \end{cases} \tag{14}$$

-continued

[Math. 4]

$$\begin{cases} a_6 = \chi_{21}\delta_{41} \\ a_5 = \chi_{11}\delta_{31} + \chi_{22}\delta_{41} + \chi_{21}\delta_{44} \\ a_4 = \chi_{11}\delta_{32} + \chi_{23}\delta_{41} + \chi_{22}\delta_{42} + \chi_{21}\delta_{43} \\ a_3 = \chi_{12}\delta_{31} + \chi_{11}\delta_{33} + \chi_{24}\delta_{41} + \chi_{23}\delta_{42} + \chi_{22}\delta_{43} + \chi_{21}\delta_{44} \\ a_2 = \chi_{12}\delta_{32} + \chi_{11}\delta_{34} + \chi_{24}\delta_{42} + \chi_{23}\delta_{43} + \chi_{22}\delta_{44} \\ a_1 = \chi_{12}\delta_{33} + \chi_{24}\delta_{43} + \chi_{23}\delta_{44} \\ a_0 = \chi_{12}\delta_{34} + \chi_{24}\delta_{44} \end{cases} \quad (15)$$

[Math. 5]

$$\begin{cases} \chi_{11} = 2J_{wr}K_{tr}^2 r_r N_r^2 J_{mr} \\ \chi_{12} = (2J_{wr} + N_r^2 J_{mr})K_{dr} r_r K_{tr}^2 \\ \chi_{21} = 2J_{wr}K_{tr} r_r N_r^2 J_{mr} \\ \chi_{22} = K_{tr}^2 r_r^3 N_r^2 J_{mr} \\ \chi_{23} = (2J_{wr} + N_r^2 J_{mr})K_{dr} K_{tr} r_r \\ \chi_{24} = K_{dr}K_{tr}^2 r_r^3 \end{cases} \quad (16)$$

[Math. 6]

$$\begin{cases} \delta_{11} = 2J_{wf}M \\ \delta_{12} = 2J_{wf}K_{tf} + K_{tf}r_f^2 M \\ \delta_{13} = K_{df}M \\ \delta_{14} = K_{df}K_{tf} \\ \delta_{21} = 2J_{wf} \\ \delta_{22} = K_{tf}r_f^2 \\ \delta_{23} = K_{df} \\ \delta_{31} = N_f^2 2J_{mf}J_{wf}M \\ \delta_{32} = N_f^2 2J_{wf}K_{tf}J_{mf} + N_f^2 r_f^2 MK_{df}K_{tf} \\ \delta_{33} = N_f^2 J_{mf}K_{df}M \\ \delta_{34} = 2J_{wf}K_{df}K_{tf} + N_f^2 J_{mf}K_{df}K_{tf} + r_f^2 MK_{df}K_{tf} \\ \delta_{41} = N_f^2 J_{mf}J_{wf} \\ \delta_{42} = N_f^2 r_f^2 K_{tf}J_{mf} \\ \delta_{43} = 2J_{wf}K_{df} + N_f^2 J_{mf}K_{df} \\ \delta_{44} = r_f^2 K_{df}K_{tf} \end{cases} \quad (17)$$

When the poles and the zero point of the transmission characteristic $G_{pff}(s)$ expressed by the equation (13) are examined, the transmission characteristic $G_{pff}(s)$ is expressed by the equation (18) below.

[Math. 7]

$$G_{pff}(s) = \frac{1}{s} \cdot M_{pff} \cdot \frac{(s+\alpha')(s+\beta')(s^2 + 2\zeta'_{pr}\omega'_{pr} + \omega'^2_{pr})(s^2 + 2\zeta_{zf}\omega_{zf} + \omega^2_{zf})}{(s+\alpha)(s+\beta)(s^2 + 2\zeta_{pr}\omega_{pr} + \omega^2_{pr})(s^2 + 2\zeta_{pf}\omega_{pf} + \omega^2_{pf})} \quad (18)$$

In the equation (18), α and α', β and β', $\zeta_{pr}$ and $\zeta_{pr}'$, and $\omega_{pr}$ and $\omega_{pr}'$ indicate values extremely close to each other. Therefore, by performing pole-zero cancellation approximate to α=α', β=β', $\zeta_{pr}=\zeta_{pr}'$, and $\omega_{pr}=\omega_{pr}'$, the transmission characteristic $G_{pff}(s)$ is expressed in a secondary/tertiary form as expressed by the following equation (19). Accordingly, in the vehicle model of the electric vehicle 100, the transmission characteristic $G_{pff}(s)$ from the front motor torque $T_{mf}$ to the rotation angular velocity $\omega_{mf}$ of the front motor 21 can be approximated in a secondary/tertiary form.

[Math. 8]

$$G_{pff}(s) = \frac{1}{s} \cdot M'_{pff} \cdot \frac{(s^2 + 2\zeta_{zf}\omega_{zf} + \omega^2_{zf})}{(s^2 + 2\zeta_{pf}\omega_{pf} + \omega^2_{pf})} \quad (19)$$

Note that according to the transmission characteristic $G_{pff}(s)$, the transmission characteristic $G_{rff}(s)$ of a model response for suppressing the torsional vibration caused by the drive shaft 27 of the front drive system 11 can be expressed by the following equation (20).

[Math. 9]

$$G_{rff}(s) = \frac{1}{s} \cdot M'_{pff} \cdot \frac{(s^2 + 2\zeta_{zf}\omega_{zf} + \omega^2_{zf})}{(s^2 + 2\omega_{pf} + \omega^2_{pf})} \quad (20)$$

Therefore, in the front drive system 11, the feedforward compensator that suppresses the torsional vibration of the drive shaft 27 can be configured by the transmission characteristic $G_{rff}(s)/G_{pff}(s)$ as expressed by the following equation (21).

[Math. 10]

$$\frac{G_{rff}(s)}{G_{pff}(s)} = \frac{(s^2 + 2\zeta_{pf}\omega_{pf} + \omega^2_{pf})}{(s^2 + 2\omega_{pf} + \omega^2_{pf})} \quad (21)$$

Similarly to the above, the transmission characteristic $G_{prr}(s)$ from the rear motor torque $T_{mr}$ to the rotation angular velocity $\omega_{mr}$ of the rear motor 31 can be obtained. That is, the transmission characteristic $G_{prr}(s)$ is expressed by the following equations (22) and (23).

[Math. 11]

$$\omega_{mr} = G_{prr}(s) \cdot T_{mr} \quad (22)$$

$$G_{prr}(s) = \frac{1}{s} \cdot M'_{prr} \cdot \frac{(s^2 + 2\zeta_{zr}\omega_{zr} + \omega^2_{zr})}{(s^2 + 2\zeta_{pr}\omega_{pr} + \omega^2_{pr})} \quad (23)$$

In the rear drive system 12, the transmission characteristic $G_{rrr}(s)$ of a model response for suppressing the torsional vibration of the drive shaft 37 is expressed by the following equation (24).

[Math. 12]

$$G_{rrr}(s) = \frac{1}{s} \cdot M'_{prr} \cdot \frac{(s^2 + 2\zeta_{zr}\omega_{zr} + \omega^2_{zr})}{(s^2 + 2\omega_{pr} + \omega^2_{pr})} \quad (24)$$

Accordingly, in the rear drive system 12, the feedforward compensator that suppresses the torsional vibration of the drive shaft 37 can be configured by the transmission characteristic $G_{rrr}(s)/G_{prr}(s)$ as expressed by the following equation (25).

[Math. 13]

$$\frac{G_{rrr}(s)}{G_{prr}(s)} = \frac{(s^2 + 2\zeta_{pr}\omega_{pr} + \omega^2_{pr})}{(s^2 + 2\omega_{pr} + \omega^2_{pr})} \quad (25)$$

The transmission characteristic $G_{prf}(s)$ from the rear motor torque $T_{mr}$ of the electric vehicle 100 to the rotation angular velocity $\omega_{mf}$ of the front motor 21 is as follows. That is, the transmission characteristic $G_{prf}(s)$ is obtained by performing the Laplace transform on the equations (1) to (11), and is expressed by the equations (26) and (27) below.

[Math. 14]

$$\omega_{mf} = G_{prf}(s) \cdot T_{mr} \quad (26)$$

$$G_{prf}(s) = \frac{1}{s} \cdot \frac{b'_0}{a_6 s^6 + a_5 s^5 + a_4 s^4 + a_3 s^3 + a_2 s^2 + a_1 s + a_0} \quad (27)$$

By examining the poles of the transmission characteristic $G_{prf}(s)$ expressed by the equation (27), it is understood that the transmission characteristic $G_{prf}(s)$ is expressed by the following equation (28).

[Math. 15]

$$G_{prf}(s) = \frac{1}{s} \cdot \frac{M_{prf}}{(s+\alpha)(s+\beta)(s^2 + 2\zeta_{pr}\omega_{pr} + \omega_{pr}^2)(s^2 + 2\zeta_{pf}\omega_{pf} + \omega_{pf}^2)} \quad (28)$$

Here, in consideration of the matter that the poles $\alpha$ and $\beta$ in the equation (28) are positioned away from an origin and a dominant pole and the influence on the transmission characteristic $G_{prf}(s)$ is small, the transmission characteristic $G_{prf}(s)$ can be approximated to the following equation (29).

[Math. 16]

$$G_{prf}(s) = \frac{1}{s} \cdot \frac{M'_{prf}}{(s^2 + 2\zeta_{pr}\omega_{pr} + \omega_{pr}^2)(s^2 + 2\zeta_{pf}\omega_{pf} + \omega_{pf}^2)} \quad (29)$$

Further, in consideration of a vibration damping control algorithm of the rear drive system 12, the transmission characteristic $G_{prf}(s)$ is expressed by the following equation (30).

[Math. 17]

$$G_{prf}(s) = \frac{1}{s} \cdot \frac{M'_{prf}}{(s^2 + 2\omega_{pr} + \omega_{pr}^2)(s^2 + 2\zeta_{pf}\omega_{pf} + \omega_{pf}^2)} \quad (30)$$

Therefore, the transmission characteristic $G_{rrf}(s)$ for suppressing the torsional vibration of the drive shaft 27 caused by an input of the rear motor torque $T_{mr}$ from a model response of the rotation angular velocity $\omega_{mf}$ of the front motor 21 is expressed by the following equation (31).

[Math. 18]

$$G_{rrf}(s) = \frac{1}{s} \cdot \frac{M'_{prf}}{(s^2 + 2\omega_{pr} + \omega_{pr}^2)(s^2 + 2\omega_{pf} + \omega_{pf}^2)} \quad (31)$$

Note that the control configuration of the electric vehicle 100 is substantially symmetrical between the front drive system 11 and the rear drive system 12, and the transmission characteristic $G_{pfr}(s)$ from the front motor torque $T_{mf}$ to the rotation angular velocity $\omega_{mr}$ of the rear motor 31 is expressed in the same form as the equations (26) to (30). The transmission characteristic $G_{rfr}(s)$ for suppressing the torsional vibration of the drive shaft 37 caused by an input of the front motor torque $T_{mf}$ from a model response of the rotation angular velocity $\omega_{mr}$ of the rear motor 31 is expressed in the same form as the equation (31).

<Stop Control>

Figure 5:
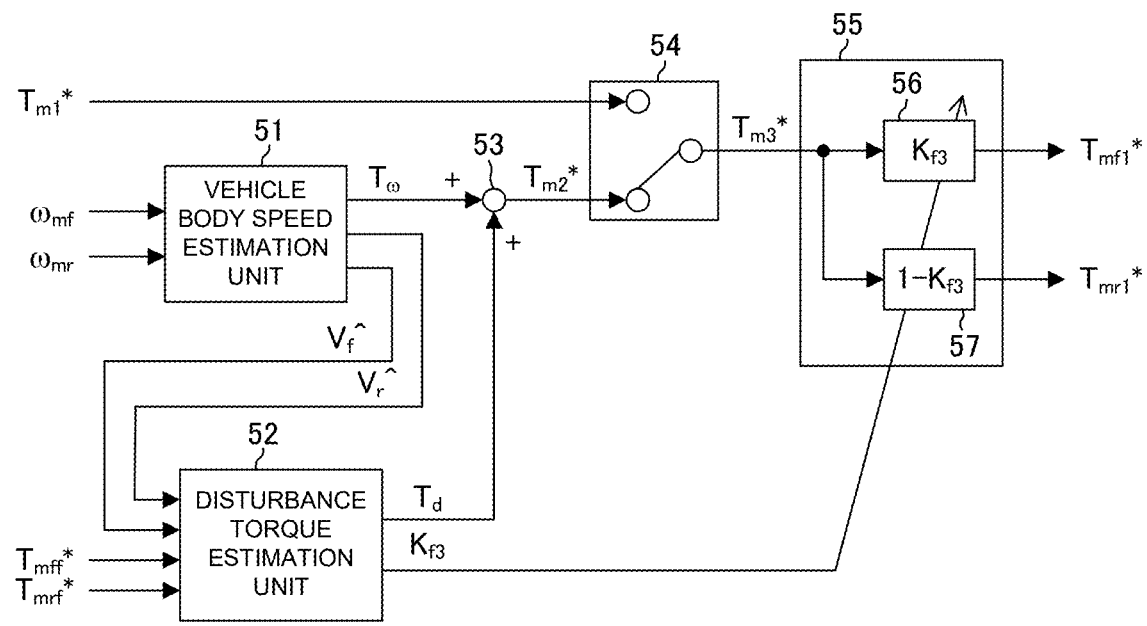
FIG. 5 is a block diagram showing a configuration for executing stop control.

FIG. 5 is a block diagram showing a configuration for executing the stop control S13. As shown in FIG. 5, the motor controller 14 functions as a vehicle body speed estimation unit 51, a disturbance torque estimation unit 52, a second torque target value calculation unit 53, a torque comparison unit 54, and a torque distribution unit 55.

The vehicle body speed estimation unit 51 estimates the vehicle body speed of the electric vehicle 100 for each driving wheel based on the rotation speed of the electric motor included in the electric vehicle 100. In the present embodiment, the vehicle body speed estimation unit 51 estimates the vehicle body speed of the electric vehicle 100 based on the rotation angular velocity $\omega_{mf}$ of the front motor 21 for the front wheels 22 which are driving wheels. Hereinafter, the vehicle body speed estimated based on the rotation angular velocity $\omega_{mf}$ of the front motor 21 is referred to as a first estimated vehicle body speed $\hat{V}_f$. Similarly, the vehicle body speed estimation unit 51 estimates the vehicle body speed of the electric vehicle 100 based on the rotation angular velocity $\omega_{mr}$ of the rear motor 31 for the rear wheels 32 which are driving wheels. Hereinafter, the vehicle body speed estimated based on the rotation angular velocity $\omega_{mr}$ of the rear motor 31 is referred to as a second estimated vehicle body speed $\hat{V}_r$. The first estimated vehicle body speed $\hat{V}_f$ and the second estimated vehicle body speed $\hat{V}_r$ are input to the disturbance torque estimation unit 52.

Further, the vehicle body speed estimation unit 51 calculates a vehicle body speed feedback torque $T_\omega$ based on the first estimated vehicle body speed $\hat{V}_f$ or the second estimated vehicle body speed $\hat{V}_r$. The vehicle body speed feedback torque $T_\omega$ converges to zero along with a decrease in the vehicle body speed of the electric vehicle 100. The vehicle body speed feedback torque $T_\omega$ is input to the second torque target value calculation unit 53.

The disturbance torque estimation unit 52 estimates the vehicle disturbance torque $T_d$ based on the front final torque command value $T_{mff}^*$ (previous value), the rear final torque command value $T_{mrf}^*$ (previous value), the first estimated vehicle body speed $\hat{V}_f$, and the second estimated vehicle body speed $\hat{V}_r$. The disturbance torque is a torque generated by disturbance such as a road surface gradient. The vehicle disturbance torque $T_d$ is a torque that can be regarded as a real disturbance torque acting on the entire electric vehicle 100 including the plurality of electric motors and the plurality of driving wheels. For example, even when there is a difference between a wheel load of the front wheels 22 and a wheel load of the rear wheels 32 due to a road surface gradient, the vehicle disturbance torque $T_d$ substantially represents a real disturbance torque in accordance with the road surface gradient, in which an error due to the wheel load difference is reduced or suppressed. The vehicle disturbance torque $T_d$ is input to the second torque target value calculation unit 53.

The disturbance torque estimation unit 52 calculates a distribution ratio Km based on the estimated vehicle disturbance torque $T_d$ and the like. The distribution ratio $K_{f3}$ is a ratio when a target value of a torque to be output by the front motor 21 and the rear motor 31 as a whole is distributed to the front torque command value $T_{mf}^*$ and the rear torque command value $T_{mr1}^*$. The distribution ratio $K_{f3}$ is set to, for example, a value from zero to 1. In the normal traveling state in which the stop control S13 is not executed, the first torque target value $T_{m1}^*$ is distributed according to the distribution ratio $K_{f3}$. In a state just before stop in which the stop control S13 is executed, the second torque target value $T_{m2}^*$ is distributed according to the distribution ratio $K_{f3}$. The distribution ratio $K_{f3}$ is input to the torque distribution unit 55.

The second torque target value calculation unit 53 calculates the second torque target value $T_{m2}^*$ based on the vehicle body speed feedback torque $T_\omega$ and the vehicle disturbance torque $T_d$. In the present embodiment, the second torque target value calculation unit 53 is an adder, and calculates the second torque target value $T_{m2}^*$ by adding up the vehicle body speed feedback torque $T_\omega$ and the vehicle disturbance torque $T_d$.

The second torque target value $T_{m2}^*$ is a criterion for determining whether to execute the stop control S13, that is, whether the electric vehicle 100 is just before stop. In the state just before stop in which the stop control S13 is executed, instead of the first torque target value $T_{m1}^*$, the second torque target value $T_{m2}^*$ is used as a target value of the torque to be output by the front motor 21 and the rear motor 31 as a whole. As described above, the vehicle body speed feedback torque $T_\omega$ converges to zero along with the decrease in the vehicle body speed of the electric vehicle 100, and therefore, the second torque target value $T_{m2}^*$ converges to the vehicle disturbance torque $T_d$ along with the decrease in the vehicle body speed of the electric vehicle 100. Accordingly, when the electric vehicle 100 stops, the second torque target value $T_{m2}^*$ represents a torque for maintaining the stop state of the electric vehicle 100 against the vehicle disturbance torque $T_d$. For example, on an uphill road, the second torque target value $T_{m2}^*$ converges to a positive torque in accordance with the road surface gradient, and on a downhill road, the second torque target value $T_{m2}^*$ converges to a negative torque in accordance with the road surface gradient. Then, on a flat road, the second torque target value $T_{m2}^*$ converges to substantially zero. The second torque target value $T_{m2}^*$ is input to the torque comparison unit 54.

The torque comparison unit 54 compares the first torque target value $T_{m1}^*$ with the second torque target value $T_{m2}^*$, and outputs either the first torque target value $T_{m1}^*$ or the second torque target value $T_{m2}^*$ as a third torque target value $T_{m3}^*$ according to the comparison result. Specifically, when the second torque target value $T_{m2}^*$ is greater than the first torque target value $T_{m1}^*$, the torque comparison unit 54 determines that the electric vehicle 100 is in a state just before stop, and outputs the second torque target value $T_{m2}^*$ as the third torque target value $T_{m3}^*$. On the other hand, when the second torque target value $T_{m2}^*$ is equal to or less than the first torque target value $T_{m1}^*$, the torque comparison unit 54 determines that the electric vehicle 100 is not in the state just before stop and is in the normal traveling state, and outputs the first torque target value $T_{m1}^*$ as the third torque target value $T_{m3}^*$. That is, the torque comparison unit 54 compares the first torque target value $T_{m1}^*$ with the second torque target value $T_{m2}^*$ to determine whether the electric vehicle 100 is in the state just before stop. Then, the torque comparison unit 54 sets the stop control S13 to be executed by outputting the second torque target value $T_{m2}^*$ as the third torque target value $T_{m3}^*$ when the electric vehicle 100 is in the state just before stop.

The torque distribution unit 55 distributes the third torque target value $T_{m3}^*$ to the front torque command value $T_{mf1}^*$ and the rear torque command value $T_{mr1}^*$ based on the distribution ratio $K_{f3}$. The torque distribution unit 55 includes a front torque command value calculation unit 56 and a rear torque command value calculation unit 57. In the present embodiment, the front torque command value calculation unit 56 calculates the front torque command value $T_{mf1}^*$ by multiplying the third torque target value $T_{m3}^*$ by the distribution ratio $K_{f3}$. The rear torque command value calculation unit 57 calculates the rear torque command value $T_{mr1}^*$ by multiplying the third torque target value $T_{m3}^*$ by "$1-K_{f3}$".

When it is determined that the electric vehicle 100 is in the state just before stop, since the actual third torque target value $T_{m3}^*$ is the second torque target value $T_{m2}^*$, the torque distribution unit 55 substantially distributes the second torque target value $T_{m2}^*$ into the front torque command value $T_{mf1}^*$ and the rear torque command value $T_{mr1}^*$. On the other hand, when the electric vehicle 100 is not in the state just before stop and is in the normal traveling state, since the actual third torque target value $T_{m3}^*$ is the first torque target value $T_{m1}^*$, the torque distribution unit 55 substantially distributes the first torque target value $T_{m1}^*$ into the front torque command value $T_{mf1}^*$ and the rear torque command value $T_{mr1}^*$.

As described above, the distribution ratio $K_{f3}$ is set or changed based on the vehicle disturbance torque $T_d$ and the like. It does not matter whether the actual third torque target value $T_{m3}^*$ is the first torque target value $T_{m1}^*$ or the second torque target value $T_{m2}^*$. That is, when it is determined that the electric vehicle 100 is in the state just before stop, the second torque target value $T_{m2}^*$ is substantially distributed in accordance with the distribution ratio $K_{f3}$ appropriately set based on the estimated vehicle disturbance torque $T_d$ and the like. In this way, the stop control S13 for stopping the electric vehicle 100 or maintaining the stop state is implemented using the front motor 21 and the rear motor 31. Further, even when the electric vehicle 100 is not in the state just before stop but in the normal traveling state, the first torque target value $T_{m1}^*$ is substantially distributed in accordance with the distribution ratio $K_{f3}$ appropriately set based on the estimated vehicle disturbance torque $T_d$ and the like. Accordingly, even in the normal traveling state, the front torque command value $T_{mf1}^*$ and the rear torque command value $T_{mr1}^*$ are appropriately set in accordance with the road surface gradient, the respective wheel loads of the front wheels 22 and the rear wheels 32, and the like. As a result, a stable traveling state is implemented.

Hereinafter, specific configurations of the vehicle body speed estimation unit 51 and the disturbance torque estimation unit 52 will be described in detail.

Figure 6:
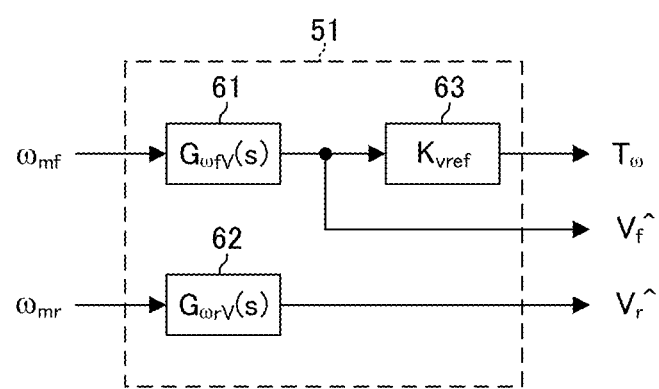
FIG. 6 is a block diagram showing a configuration of a vehicle body speed estimation unit.

FIG. 6 is a block diagram showing a configuration of the vehicle body speed estimation unit 51. As shown in FIG. 6, the vehicle body speed estimation unit 51 includes a first estimated vehicle body speed calculation unit 61, a second estimated vehicle body speed calculation unit 62, and a vehicle body speed feedback torque calculation unit 63.

The first estimated vehicle body speed calculation unit 61 calculates the first estimated vehicle body speed $V_f^\wedge$ based on the rotation angular velocity $\omega_{mf}$ of the front motor 21. The first estimated vehicle body speed calculation unit 61 is configured by, for example, a transmission characteristic $G_{\omega fV}(s)$ from the rotation angular velocity $\omega_{mf}$ of the front motor 21 to the vehicle body speed at the drive shaft 27 of the front drive system 11. In the present embodiment, the transmission characteristic $G_{\omega fV}(s)$ is a constant $K_{\omega fV}$ determined by an over-all gear ratio $N_f$ of the front drive system 11 and a dynamic tire load radius $r_f$ of the front wheels 22, as expressed by the following equation (32). The constant $K_{\omega fV}$ is expressed by the following equation (33) using the over-all gear ratio $N_f$ of the front drive system 11 and the dynamic tire load radius $r_f$ of the front wheels 22.

[Math. 19]

$$G_{\omega fV}(s) = K_{\omega fV} \tag{32}$$

$$K_{\omega fV} = \frac{r_f}{N_f} \tag{33}$$

Note that as the transmission characteristic $G_{\omega fV}(s)$ constituting the first estimated vehicle body speed calculation unit 61, a filter or the like expressed by the following equation (34) obtained by approximating the transmission characteristic from the rotation angular velocity $\omega_{mf}$ of the front motor 21 to the vehicle body speed may be used instead of the constant $K_{\omega fV}$ as described above.

[Math. 20]

$$G_{\omega fV}(s) = \frac{K_{\omega fV}\tau_{\omega fV}}{(s+\tau_{\omega fV})} \tag{34}$$

The second estimated vehicle body speed calculation unit 62 calculates the second estimated vehicle body speed $V_r\hat{}$ based on the rotation angular velocity $\omega_{mr}$ of the rear motor 31. The second estimated vehicle body speed calculation unit 62 is configured by, for example, a transmission characteristic $G_{\omega rV}(s)$ from the rotation angular velocity $\omega_{mr}$ of the rear motor 31 to the vehicle body speed at the drive shaft 37 of the rear drive system 12. In the present embodiment, the transmission characteristic $G_{\omega rV}(s)$ is a constant $K_{\omega rV}$ determined by an over-all gear ratio $N_r$ of the rear drive system 12 and a dynamic tire load radius $r_r$ of the rear wheels 32, as expressed by the following equation (35). The constant $K_{\omega rV}$ is expressed by the following equation (36) using the over-all gear ratio $N_r$ of the rear drive system 12 and the dynamic tire load radius $r_r$ of the rear wheels 32.

[Math. 21]

$$G_{\omega rV}(s) = K_{\omega rV} \tag{35}$$

$$K_{\omega rV} = \frac{r_r}{N_r} \tag{36}$$

Note that as the transmission characteristic $G_{\omega rV}(s)$ constituting the second estimated vehicle body speed calculation unit 62, a filter or the like expressed by the following equation (37) obtained by approximating the transmission characteristic from the rotation angular velocity $\omega_{mr}$ of the rear motor 31 to the vehicle body speed may be used instead of the constant $K_{\omega rV}$ as described above.

[Math. 22]

$$G_{\omega rV}(s) = \frac{K_{\omega rV}\tau_{\omega rV}}{(s+\tau_{\omega rV})} \tag{37}$$

The vehicle body speed feedback torque calculation unit 63 calculates the vehicle body speed feedback torque $T_\omega$ by multiplying the first estimated vehicle body speed $V_f\hat{}$ by a gain $K_{vref}$. The gain $K_{vref}$ is determined in advance by adaptation based on experiments, simulations, or the like. However, the gain $K_{vref}$ is negative ($K_{vref}<0$). Note that the vehicle body speed feedback torque calculation unit 63 may calculate the vehicle body speed feedback torque $T_\omega$ by multiplying the second estimated vehicle body speed $V_r\hat{}$ by the gain $K_{vref}$.

Figure 7:
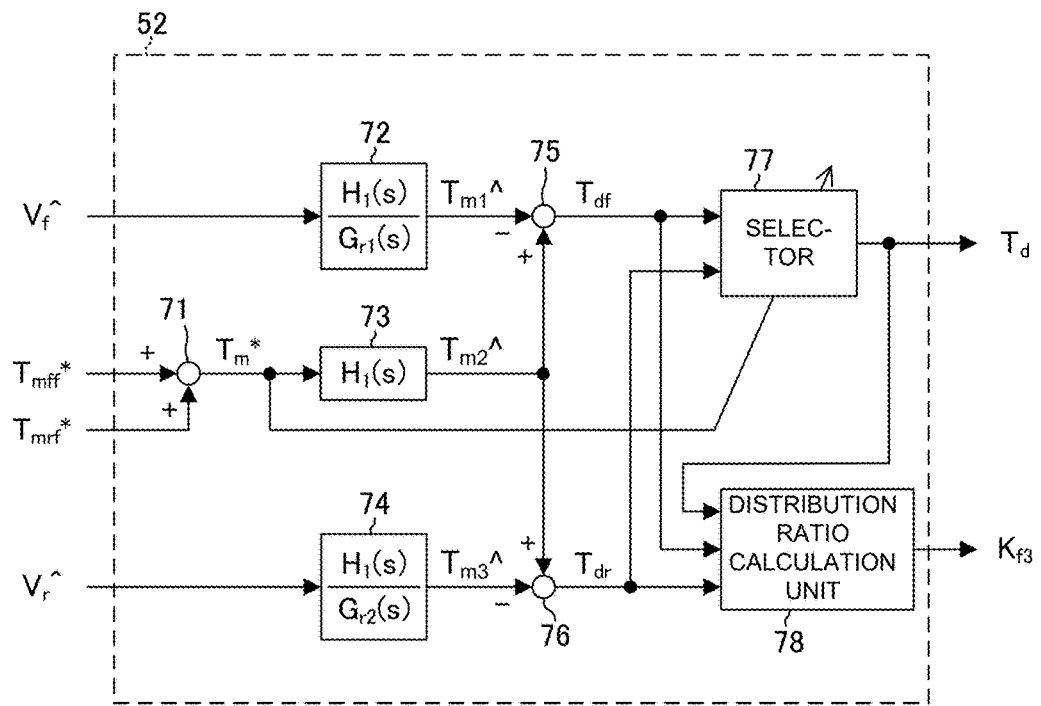
FIG. 7 is a block diagram showing a configuration of a disturbance torque estimation unit.

FIG. 7 is a block diagram showing a configuration of the disturbance torque estimation unit 52. As shown in FIG. 7, the disturbance torque estimation unit 52 includes a total torque calculation unit 71, a first estimated torque calculation unit 72, a second estimated torque calculation unit 73, a third estimated torque calculation unit 74, a first driving wheel disturbance torque estimation unit 75, a second driving wheel disturbance torque estimation unit 76, a selector 77, and a distribution ratio calculation unit 78.

The total torque calculation unit 71 calculates a total torque $T_m*$, which is a target value of a sum of torques to be output by the plurality of driving wheels. In the present embodiment, the total torque calculation unit 71 is an adder and calculates the total torque $T_m*$ by adding up the front final torque command value $T_{mff}*$ (previous value) and the rear final torque command value $T_{mrf}*$ (previous value). When the over-all gear ratios $N_f$, $N_r$ and the dynamic tire load radiuses $r_f$, $r_r$ in the front drive system 11 and the rear drive system 12 are different from each other, the total torque calculation unit 71 multiplies, for example, the rear final torque command value $T_{mrf}*$ by a gain converted into an output shaft torque of the front motor 21. The total torque $T_m*$ is input to the second estimated torque calculation unit 73 and the selector 77.

Note that the total torque calculation unit 71 is an adder, and may calculate the total torque $T_m*$ using parameters different from the front final torque command value $T_{mff}*$ (previous value) and the rear final torque command value $T_{mrf}*$ (previous value). For example, since the third torque target value $T_{m3}*$ is one of the parameters representing the sum of the torques to be output by the front wheels 22 and the rear wheels 32, the total torque calculation unit 71 can acquire the third torque target value $T_{m3}*$ and use it as the total torque $T_m*$. However, since the front final torque command value $T_{mff}*$ and the rear final torque command value $T_{mrf}*$ are final command values after the vibration damping control S14, it is preferable that the total torque calculation unit 71 calculates the total torque $T_m*$ using the front final torque command value $T_{mff}*$ and the rear final torque command value $T_{mrf}*$ as described above. In this way, accuracy of the vehicle disturbance torque $T_d$ and the distribution ratio $K_{f3}$ calculated by the disturbance torque estimation unit 52 is improved.

The first estimated torque calculation unit 72 calculates a first estimated torque $T_{m1}\hat{}$ based on the first estimated vehicle body speed $V_f\hat{}$. The first estimated torque $T_{m1}\hat{}$ is an estimation value for a total amount of the front motor torque $T_{mf}$ and the rear motor torque $T_{mr}$. That is, the first estimated torque $T_{m1}\hat{}$ represents a torque (hereinafter, referred to as a vehicle torque) corresponding to the driving force to be exerted by the entire electric vehicle 100. However, the first estimated torque $T_{m1}\hat{}$ represents a vehicle torque on which an error due to a change in the wheel loads of the front wheels 22 and the rear wheels 32 or the like is superimposed. In the present embodiment, the first estimated torque calculation unit 72 is implemented by a filter $H_1(s)/G_{r1}(s)$ configured by a vehicle response $G_{r1}(s)$ and a low-pass filter $H_1(s)$. That is, the first estimated torque calculation unit 72 calculates the first estimated torque $T_{m1}\hat{}$ by filtering the first estimated vehicle body speed $V_f\hat{}$ by the filter $H_1(s)/G_{r1}(s)$.

The vehicle response $G_{r1}(s)$ is expressed by the following equation (38) using an equivalent mass $M_v$ of the electric vehicle 100 and a coefficient $K_{Mf}$. The equivalent mass $M_v$ is expressed by the following equation (39) using a vehicle mass M of the electric vehicle 100, the motor inertia $J_{mf}$, $J_{mr}$ of the front motor 21 and the rear motor 31, the inertia (wheel inertia) $J_{wf}$, $J_{wr}$ of the drive shafts 27, 37, and the like. The coefficient $K_{Mf}$ is expressed by the following equation (40) using the over-all gear ratio $N_f$ of the front drive system 11 and the tire load radius $r_f$ of the front wheels 22.

[Math. 23]

$$G_{r1}(s) = \frac{K_{Mf}}{M_V s} \quad (38)$$

$$M_V = M + \frac{2J_{wf}}{r_f^2} + \frac{2J_{wr}}{r_r^2} + \frac{J_{mf}N_f^2}{r_f^2} + \frac{J_{mr}N_r^2}{r_r^2} \quad (39)$$

$$K_{Mf} = \frac{N_f^2}{r_f^2} \quad (40)$$

The low-pass filter $H_1(s)$ is determined to be equal to or greater than a difference between the denominator order and the numerator order of the vehicle response $G_{r1}(s)$. In the present embodiment, the low-pass filter $H_1(s)$ is expressed by the following equation (41).

[Math. 24]

$$H_1(s) = \frac{1}{\tau_V s + 1} \quad (41)$$

The second estimated torque calculation unit 73 calculates a second estimated torque $T_{m2}\hat{}$ based on the total torque $T_m^*$. In the present embodiment, in accordance with the method for estimating the first estimated torque $T_{m1}\hat{}$ and a third estimated torque $T_{m3}\hat{}$, the second estimated torque calculation unit 73 calculates the second estimated torque $T_{m2}\hat{}$ by filtering the total torque $T_m^*$ with the low-pass filter $H_1(s)$. The second estimated torque $T_{m2}\hat{}$ represents a vehicle torque corresponding to the driving force to be exerted by the entire electric vehicle 100. However, the second estimated torque $T_{m2}\hat{}$ represents a vehicle torque in an ideal state in which an error due to a change in the wheel loads of the front wheels 22 and the rear wheels 32 or the like is not superimposed. Therefore, the second estimated torque $T_{m2}\hat{}$ is input to the first driving wheel disturbance torque estimation unit 75 and the second driving wheel disturbance torque estimation unit 76, and is used as a reference value for calculating a first driving wheel disturbance torque $T_{df}$ and a second driving wheel disturbance torque $T_{dr}$.

The third estimated torque calculation unit 74 calculates the third estimated torque $T_{m3}\hat{}$ based on the second estimated vehicle body speed $V_r\hat{}$. The third estimated torque $T_{m3}\hat{}$ is an estimation value for the total amount of the front motor torque $T_{mf}$ and the rear motor torque $T_{mr}$. That is, the third estimated torque $T_{m3}\hat{}$ represents a vehicle torque corresponding to the driving force to be exerted by the entire electric vehicle 100. However, the third estimated torque $T_{m3}\hat{}$ represents a vehicle torque on which an error due to a change in the wheel loads of the front wheels 22 and the rear wheels 32 or the like is superimposed. In the present embodiment, the third estimated torque calculation unit 74 is implemented by a filter $H_1(s)/G_{r2}(s)$ configured by a vehicle response $G_{r2}(s)$ and the low-pass filter $H_1(s)$. That is, the third estimated torque calculation unit 74 calculates the third estimated torque $T_{m3}\hat{}$ by filtering the second estimated vehicle body speed VIA by the filter $H_1(s)/G_{r2}(s)$.

The vehicle response $G_{r2}(s)$ is expressed by the following equation (42) using the equivalent mass My of the electric vehicle 100 and a coefficient $K_{Mr}$. The equivalent mass $M_v$ is represented by the above equation (39). The coefficient $K_{Mr}$ is expressed by the following equation (43) using the over-all gear ratio $N_r$ of the rear drive system 12 and the tire load radius $r_r$ of the rear wheels 32.

[Math. 25]

$$G_{r2}(s) = \frac{K_{Mr}}{M_V s} \quad (42)$$

$$K_{Mr} = \frac{N_r^2}{r_r^2} \quad (43)$$

The first driving wheel disturbance torque estimation unit 75 calculates the first driving wheel disturbance torque Tar based on the first estimated torque $T_{m1}\hat{}$ and the second estimated torque $T_{m2}\hat{}$. In the present embodiment, the first driving wheel disturbance torque estimation unit 75 is a subtractor, and calculates the first driving wheel disturbance torque Tar by subtracting the first estimated torque $T_{m1}\hat{}$ from the second estimated torque $T_{m2}\hat{}$. The driving wheel disturbance torque is an estimation value relating to the disturbance torque acting on the driving wheels. That is, the first driving wheel disturbance torque $T_{df}$ represents a disturbance torque estimated from a driving state of the front motor 21 (or the front wheels 22 or the front drive system 11). The first driving wheel disturbance torque $T_{df}$ is input to the selector 77 and the distribution ratio calculation unit 78.

The second driving wheel disturbance torque estimation unit 76 calculates the second driving wheel disturbance torque $T_{dr}$ based on the third estimated torque $T_{m3}\hat{}$ and the second estimated torque $T_{m2}\hat{}$. In the present embodiment, the second driving wheel disturbance torque estimation unit 76 is a subtractor, and calculates the second driving wheel disturbance torque $T_{dr}$ by subtracting the third estimated torque $T_{m3}\hat{}$ from the second estimated torque $T_{m2}\hat{}$. The second driving wheel disturbance torque $T_{dr}$ represents a disturbance torque estimated from a driving state of the rear motor 31 (or the rear wheels 32 or the rear drive system 12). Ideally, the second driving wheel disturbance torque $T_{dr}$ has the same value as the first driving wheel disturbance torque $T_{df}$. However, in reality, when a difference occurs between the wheel loads of the front wheels 22 and the rear wheels 32 due to a road surface gradient or the like, a difference also occurs between the first driving wheel disturbance torque $T_{df}$ and the second driving wheel disturbance torque $T_{dr}$. The second driving wheel disturbance torque $T_{dr}$ is input to the selector 77 and the distribution ratio calculation unit 78.

The selector 77 selects one of the first driving wheel disturbance torque $T_{df}$ and the second driving wheel disturbance torque $T_{dr}$ based on the total torque $T_m^*$, and outputs the selected torque as the vehicle disturbance torque $T_d$. Specifically, as shown in the following equation (44), when the total torque $T_m^*$ is a negative value, the selector 77 outputs the minimum value of the first driving wheel disturbance torque $T_{df}$ and the second driving wheel disturbance torque $T_{dr}$ as the vehicle disturbance torque $T_d$. On the other hand, when the total torque $T_m^*$ is equal to or greater than zero (zero or a positive value), the selector 77 outputs the maximum value of the first driving wheel disturbance torque $T_{df}$ and the second driving wheel disturbance torque $T_{dr}$ as the vehicle disturbance torque $T_d$. That is, the selector 77 functions as a vehicle disturbance torque estimation unit for estimating the vehicle disturbance torque $T_d$ based on the first driving wheel disturbance torque $T_{df}$ and the second driving wheel disturbance torque $T_{dr}$ estimated for the front wheels 22 and the rear wheels 32 respectively. The selector 77 also functions as a slip detection unit for detecting a slip of the front wheels 22 or the rear wheels 32 caused by a change in the wheel load or the like. Further, the selector 77 functions as a slip suppression unit for suppressing a slip of the front wheels 22 or the rear wheels 32 caused by a change in the wheel load or the like by reducing or suppressing a change in the vehicle disturbance torque $T_d$ according to a change in the wheel load or the like of the front wheels 22 and the rear wheels 32. Note that the term "slip" refers to a difference in the rotation speed between the front wheels 22 and the rear wheels 32, which are driving wheels. As described above, the vehicle disturbance torque $T_d$ is output to the second torque target value calculation unit 53, and the selector 77 outputs the vehicle disturbance torque $T_d$ to the distribution ratio calculation unit 78.

[Math. 26]

$$T_d = \begin{cases} \min(T_{df}, T_{dr}) & (T_m^* < 0) \\ \max(T_{df}, T_{dr}) & (T_m^* \geq 0) \end{cases} \quad (44)$$

Note that the disturbance acting on the electric vehicle 100 includes an air resistance, a modeling error due to an actual vehicle mass depending on the number of occupants and a load, a rolling resistance of tires, a gradient resistance, and the like. Among the above, the gradient resistance is dominant when the electric vehicle 100 is in the state just before stop. Although these disturbance factors differ depending on specific driving conditions, since the disturbance torque estimation unit 52 estimates the vehicle disturbance torque $T_d$ based on the front torque command value $T_{mf1}^*$, the rear torque command value $T_{mr1}^*$, and the equivalent mass $M_V$ as described above, these disturbance factors can be estimated all at once. Therefore, by controlling the output torques of the front motor 21 and the rear motor 31 based on the vehicle disturbance torque $T_d$, the electric vehicle 100 can be accurately controlled under various driving conditions.

The distribution ratio calculation unit 78 calculates the distribution ratio $K_{f3}$ based on the first driving wheel disturbance torque $T_{df}$, the second driving wheel disturbance torque $T_{dr}$, and the vehicle disturbance torque $T_d$.

Figure 8:
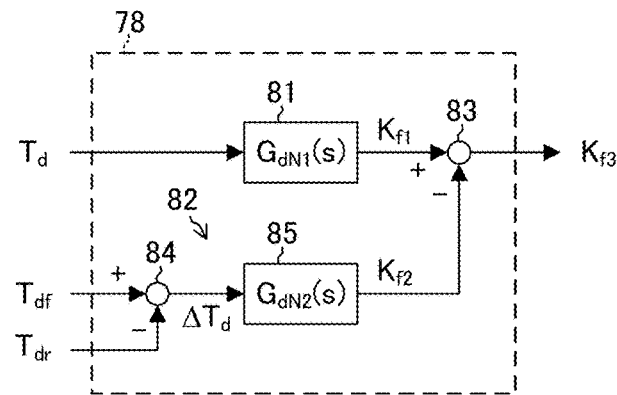
FIG. 8 is a block diagram showing a configuration of a distribution ratio calculation unit.

FIG. 8 is a block diagram showing a configuration of the distribution ratio calculation unit 78. As shown in FIG. 8, the distribution ratio calculation unit 78 includes a first distribution ratio calculation unit 81, a second distribution ratio calculation unit 82, and a third distribution ratio calculation unit 83.

The first distribution ratio calculation unit 81 calculates a first distribution ratio $K_{f1}$ based on the vehicle disturbance torque $T_d$. The first distribution ratio $K_{f1}$ is a basic distribution ratio of the driving force in an ideal state in which there is no change in the wheel loads of the driving wheels or the like. In the present embodiment, the first distribution ratio calculation unit 81 calculates the first distribution ratio $K_{f1}$ according to the following equation (45) using a transmission characteristic $G_{dN1}(s)$ from the vehicle disturbance torque $T_d$ to the distribution ratio of the driving force. The transmission characteristic $G_{dN1}(s)$ is expressed by the following equation (46) using a coefficient $K_{dN1}$. The coefficient $K_{dN1}$ is determined in advance by adaptation based on experiments, simulations, or the like.

[Math. 27]

$$K_{f1} = 0.5 - G_{dN1}(s)T_d \quad (45)$$

$$G_{dN1}(s) = \frac{K_{dN1}}{\tau_{dN1}s + 1} \quad (46)$$

The second distribution ratio calculation unit 82 includes, for example, a first calculation unit 84 and a second calculation unit 85. The first calculation unit 84 is a driving wheel disturbance torque deviation calculation unit that calculates a driving wheel disturbance torque deviation $\Delta T_d$ which is a deviation between the first driving wheel disturbance torque $T_{df}$ and the second driving wheel disturbance torque $T_{dr}$. In the present embodiment, the first calculation unit 84 calculates the driving wheel disturbance torque deviation $\Delta T_d$ by subtracting the second driving wheel disturbance torque $T_{dr}$ from the first driving wheel disturbance torque $T_{df}$. The second calculation unit 85 calculates the second distribution ratio $K_{f2}$ according to the following equation (47) using a transmission characteristic $G_{dN2}(s)$ from the driving wheel disturbance torque deviation $\Delta T_d$ to the distribution ratio of the driving force. In the present embodiment, as expressed by the following equation (48), the transmission characteristic $G_{dN2}(s)$ is a coefficient $K_{dN2}$ determined in advance by adaptation based on experiments or simulations. The second distribution ratio $K_{f2}$ is a distribution ratio that functions as a correction term or an adjustment term for the first distribution ratio $K_{f1}$ which is a basic distribution ratio, and functions when there is a difference between the first driving wheel disturbance torque $T_{df}$ and the second driving wheel disturbance torque $T_{dr}$.

[Math. 28]

$$K_{f2} = (T_{df} - T_{dr})G_{dN2}(s) \quad (47)$$

$$G_{dN2}(s) = K_{dN2} \quad (48)$$

Note that the transmission characteristic $G_{dN2}(s)$ may be a transmission characteristic of a first-order lag as expressed by the following equation (49).

[Math. 29]

$$G_{dN2}(s) = \frac{K_{dN2}}{\tau_{dN2}s + 1} \quad (49)$$

The third distribution ratio calculation unit 83 calculates a final distribution ratio $K_{f3}$ (third distribution ratio) of the driving force based on the first distribution ratio $K_{f1}$ and the second distribution ratio $K_{f2}$. In the present embodiment, the third distribution ratio calculation unit 83 is a subtractor and calculates the distribution ratio $K_{f3}$ by subtracting the second distribution ratio $K_{f2}$ from the first distribution ratio $K_{f1}$. As described above, in the electric vehicle 100, the third torque target value $T_{m3}^*$ is distributed to the front torque command value $T_{mf1}^*$ and the rear torque command value $T_{mr1}^*$ in accordance with the distribution ratio Km, so that the driving force is distributed to the front wheels 22 and the rear wheels 32. Accordingly, for example, even in a case where there is a difference in the wheel load between the front wheels 22 and the rear wheels 32 due to a road surface gradient or the like, appropriate driving forces according to the situation are distributed to the front wheels 22 and the rear wheels 32.

<Vibration Damping Control>

Figure 9:
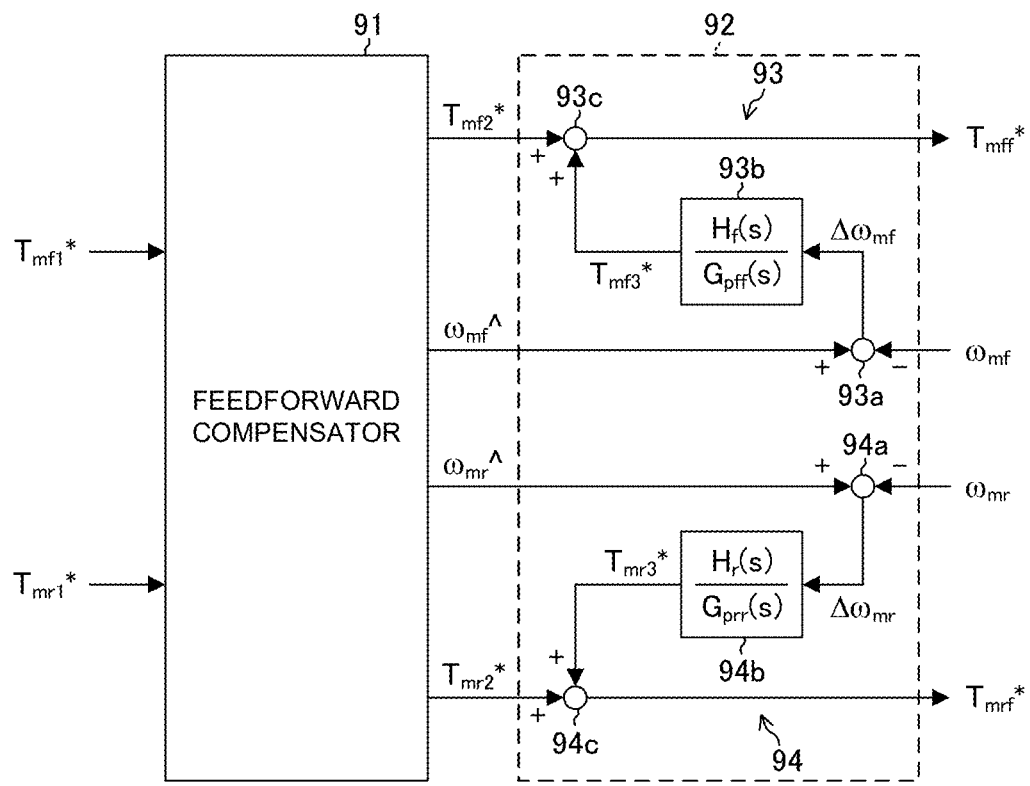
FIG. 9 is a block diagram showing a configuration for executing vibration damping control.

FIG. 9 is a block diagram showing a configuration for executing vibration damping control S14. As shown in FIG. 9, the motor controller 14 functions as a feedforward compensator 91 and a feedback compensator 92.

The feedforward compensator 91 calculates a second front torque command value $T_{mf2}^*$, a second rear torque command value $T_{mr2}^*$, an estimated rotation angular velocity $\hat{\omega}_{mf}$ of the front motor 21 and an estimated rotation angular velocity $\hat{\omega}_{mr}$ of the rear motor 31, based on the front torque command value $T_{mf1}^*$ and the rear torque command value $T_{mr1}^*$. The second front torque command value $T_{mf2}^*$ is a front torque command value after feedforward compensation. The second rear torque command value $T_{mr2}^*$ is a rear torque command value after feedforward compensation.

Figure 10:
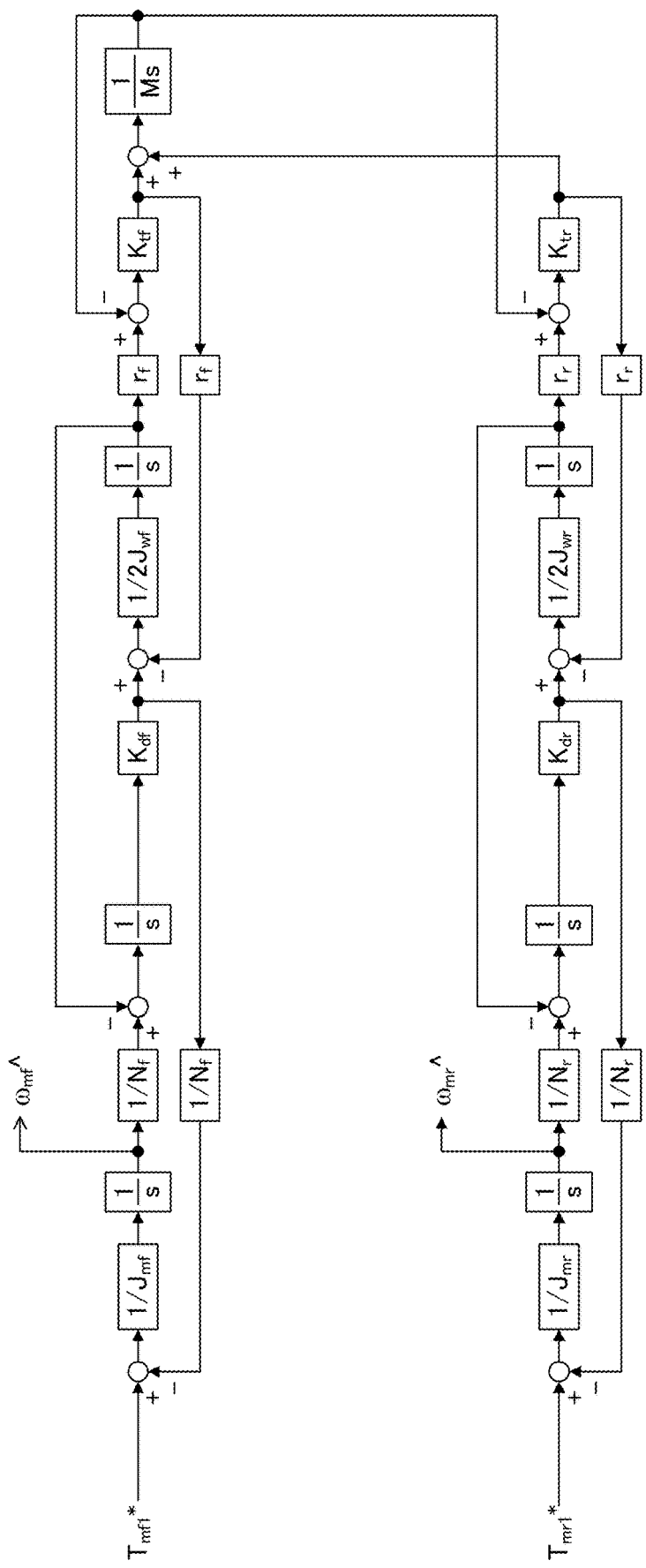
FIG. 10 is a block diagram showing a vehicle model of the electric vehicle.
Figure 11:
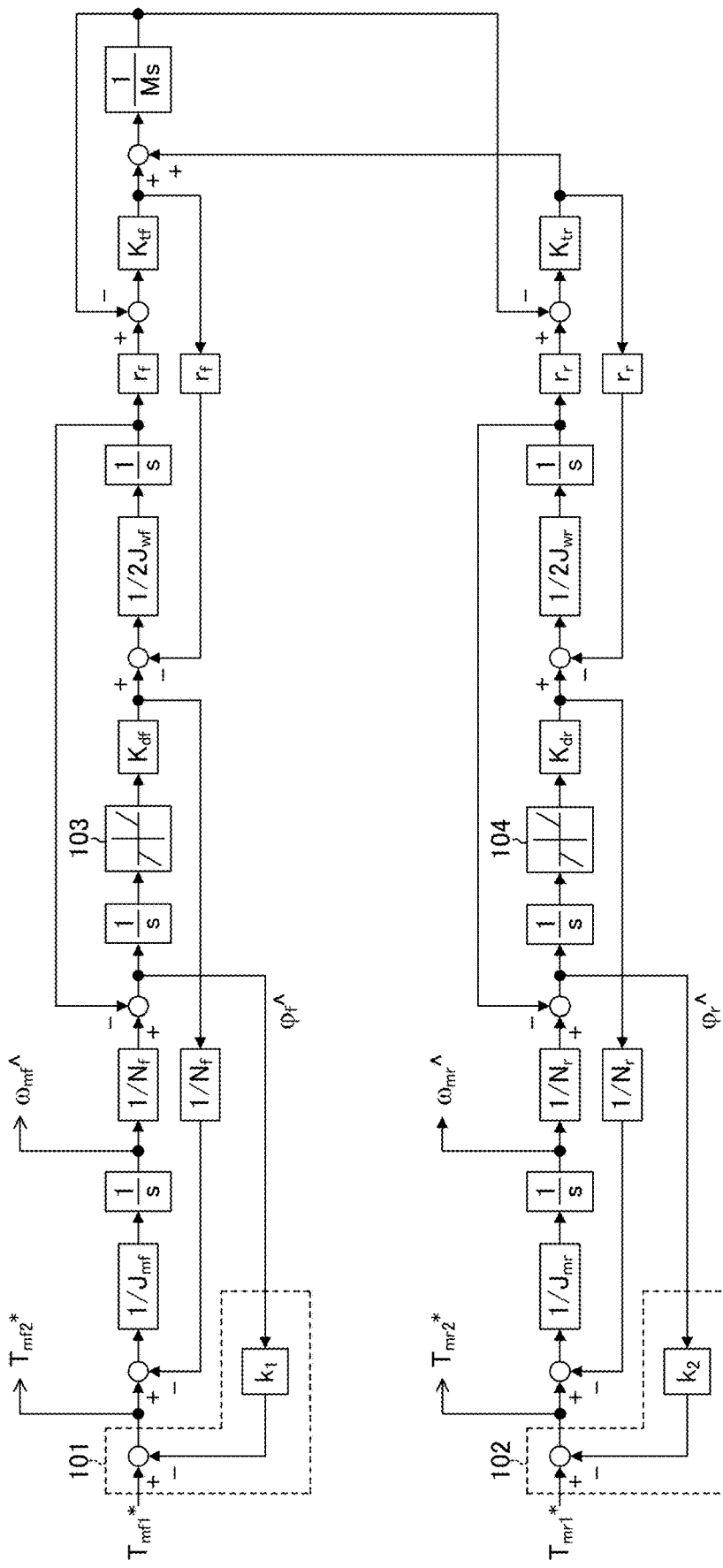
FIG. 11 is a block diagram of a feedforward compensator.

FIG. 10 is a block diagram showing a vehicle model of the electric vehicle 100. Details of the vehicle model shown in FIG. 10 are as described above. FIG. 11 is a block diagram of the feedforward compensator 91. As shown in FIGS. 10 and 11, the feedforward compensator 91 has a configuration in which torsional vibration compensation units 101, 102 and dead zone models 103, 104 are added to the vehicle model of the electric vehicle 100.

The torsional vibration compensation unit 101 compensates for the torsional vibration of the drive shaft 27 in the front drive system 11 for the front torque command value $T_{mf1}^*$. The torsional vibration compensation unit 101 calculates a torsional vibration compensation value by multiplying an estimated torsional angular velocity $\hat{\varphi}_f$ of the drive shaft 27 by a gain $k_1$. The torsional vibration compensation unit 101 subtracts the torsional vibration compensation value $(k_1 \hat{\varphi}_f)$ from the front torque command value $T_{mf1}^*$ to calculate the second front torque command value $T_{mf2}^*$.

In a transmission characteristic from the front motor torque $T_{mf}$ to a torque of the drive shaft 27 (hereinafter, referred to as a drive shaft torque $T_{DSf}$), when an attenuation coefficient appearing in the denominator is designed to be "1", the gain $k_1$ is expressed by the following equation (50). Note that $\zeta_{pf}$ is an attenuation coefficient of a torque transmission system in the front drive system 11. In addition, $\varphi_{pf}$ is a natural vibration frequency of the torque transmission system in the front drive system 11. In addition, $g_{tf}$ is a steady gain from the front motor torque $T_{mf}$ to the drive shaft torque $T_{DSf}$.

[Math. 30]

$$k_1 = 2(1-\zeta_{pf})\omega_{pf} K_{df}/g_{tf} \tag{50}$$

The torsional vibration compensation unit 102 compensates the torsional vibration of the drive shaft 37 in the rear drive system 12 for the rear torque command value $T_{mr1}^*$. The torsional vibration compensation unit 102 calculates the torsional vibration compensation value by multiplying the estimated torsional angular velocity $\hat{\varphi}_r$ of the drive shaft 37 by a gain $k_2$. Then, the torsional vibration compensation unit 102 subtracts the torsional vibration compensation value $(k_2 \hat{\varphi}_r)$ from the rear torque command value $T_{mr1}^*$ to calculate the second rear torque command value $T_{mr2}^*$.

The gain $k_2$ is set similarly to the gain $k_1$. That is, in a transmission characteristic from the rear motor torque $T_{mr}$ to a torque of the drive shaft 37 (hereinafter, referred to as a drive shaft torque $T_{DSr}$), when an attenuation coefficient appearing in the denominator is designed to be "1", the gain $k_2$ is expressed by the following equation (51). Note that, $\zeta_{pr}$ is an attenuation coefficient of the torque transmission system in the rear drive system 12. In addition, $\omega_{pr}$ is a natural vibration frequency of the torque transmission system in the rear drive system 12. In addition, $g_{tr}$ is a steady gain from the rear motor torque $T_{mr}$ to the drive shaft torque $T_{DSr}$.

[Math. 31]

$$k_2 = 2(1-\zeta_{pr})\omega_{pr} K_{dr}/g_{tr} \tag{51}$$

The dead zone model 103 is a model simulating backlash characteristics of gears used in the front drive system 11. The dead zone model 103 is expressed by the following equation (52). Similarly, the dead zone model 104 is a model simulating backlash characteristics of gears used in the rear drive system 12. The dead zone model 104 is expressed by the following equation (53). Note that θar and θar are torsional angles, and $\theta_{deadf}$ and $\theta_{deadr}$ are angles in dead zones (backlash characteristics).

[Math. 32]

$$T_{DSf} = \begin{cases} K_{df}(\theta_{df} - \theta_{deadf}/2) & (\theta_{df} \geq \theta_{deadf}/2) \\ 0 & (-\theta_{deadf}/2 < \theta_{df} < \theta_{deadf}/2) \\ K_{df}(\theta_{df} + \theta_{deadf}/2) & (\theta_{df} \leq -\theta_{deadf}/2) \end{cases} \tag{52}$$

$$T_{DSr} = \begin{cases} K_{dr}(\theta_{dr} - \theta_{deadr}/2) & (\theta_{dr} \geq \theta_{deadr}/2) \\ 0 & (-\theta_{deadr}/2 < \theta_{dr} < \theta_{deadr}/2) \\ K_{dr}(\theta_{dr} + \theta_{deadr}/2) & (\theta_{dr} \leq -\theta_{deadr}/2) \end{cases} \tag{53}$$

The feedback compensator 92 (see FIG. 9) calculates the front final torque command value $T_{mff}$ based on the second front torque command value $T_{mf2}^*$, the estimated rotation angular velocity $\hat{\omega}_{mf}$ of the front motor 21, and an actual rotation angular velocity $\omega_{mf}$ of the front motor 21. The feedback compensator 92 calculates the rear final torque command value $T_{mrf}^*$ based on the second rear torque command value $T_{mr2}^*$, the estimated rotation angular velocity $\hat{\omega}_{mr}$ of the rear motor 31, and the actual rotation angular velocity $\omega_{mr}$ of the rear motor 31. Specifically, the feedback compensator 92 includes a first feedback calculation unit 93 that calculates the front final torque command value $T_{mff}^*$, and a second feedback calculation unit 94 that calculates the rear final torque command value $T_{mrf}^*$.

The first feedback calculation unit 93 includes a deviation calculation unit 93a, a feedback torque calculation unit 93b, and a compensation unit 93c. The deviation calculation unit 93a calculates a deviation $\Delta\omega_{mf}$ between the estimated rotation angular velocity $\hat{\omega}_{mf}$ of the front motor 21 and the actual rotation angular velocity $\omega_{mf}$. In the present embodiment, the deviation calculation unit 93a calculates the deviation $\Delta\omega_{mf}$ by subtracting the actual rotation angular velocity $\omega_{mf}$ from the estimated rotation angular velocity $\hat{\omega}_{mf}$. The feedback torque calculation unit 93b calculates a feedback torque $T_{mf3}^*$ for the second front torque command value $T_{mf2}^*$ based on the deviation $\Delta\omega_{mf}$. The compensation unit 93c calculates the front final torque command value $T_{mff}$ based on the second front torque command value $T_{mf2}^*$ and the feedback torque $T_{mf3}^*$. In the present embodiment, the compensation unit 93c calculates the front final torque command value $T_{mff}^*$ by adding the feedback torque $T_{mf3}^*$ to the second front torque command value $T_{mf2}^*$.

The feedback torque calculation unit 93b is configured by a filter $H_f(s)/G_{pff}(s)$ using a band-pass filter $H_f(s)$ and the above-described transmission characteristic $G_{pff}(s)$. The band-pass filter $H_f(s)$ is set such that attenuation characteristics on a low-pass side and a high-pass side substantially coincide with each other, and a torsional resonance frequency of the front drive system 11 is substantially at a center of a passband on a logarithmic axis. When the band-pass filter $H_f(s)$ is configured by a first-order low-pass filter and a first-order high-pass filter, the band-pass filter $H_f(s)$ is expressed by the following equation (54). A time constant and a cut-off frequency are as expressed by the following equations (55) to (58). Note that "$f_{pf}$" is a torsional resonance frequency of the front drive system 11. In addition, "$k_f$" is a coefficient determined in advance by adaptation based on experiments or simulations.

[Math. 33]

$$H_f(s) = \frac{\tau_{Hf} s}{(1 + \tau_{Hf} s) \cdot (1 + \tau_{Lf} s)} \qquad (54)$$

$$\tau_{Lf} = 1/(2\pi f_{HCf}) \qquad (55)$$

$$f_{HCf} = k_f \cdot f_{pf} \qquad (56)$$

$$\tau_{Hf} = 1/(2\pi f_{LCf}) \qquad (57)$$

$$f_{LCf} = f_{pf}/k_f \qquad (58)$$

The second feedback calculation unit 94 is configured similarly to the first feedback calculation unit 93. That is, the second feedback calculation unit 94 includes a deviation calculation unit 94a, a feedback torque calculation unit 94b, and a compensation unit 94c. The deviation calculation unit 94a calculates a deviation $\Delta\omega_{mr}$ between the estimated rotation angular velocity $\omega_{mr}\hat{}$ of the rear motor 31 and the actual rotation angular velocity $\omega_{mr}$. The feedback torque calculation unit 94b calculates a feedback torque $T_{mr3}^*$ for the second rear torque command value $T_{mr2}^*$ based on the deviation $\Delta\omega_{mr}$. The compensation unit 94c calculates the rear final torque command value $T_{mrf}^*$ based on the second rear torque command value $T_{mr2}^*$ and the feedback torque $T_{mr3}^*$.

The feedback torque calculation unit 94b is configured by a filter $H_r(s)/G_{prr}(s)$ using a band-pass filter $H_r(s)$ and the above-described transmission characteristic $G_{pff}(s)$. The band-pass filter $H_r(s)$ is set such that attenuation characteristics on a low-pass side and a high-pass side substantially coincide with each other, and a torsional resonance frequency of the rear drive system 12 is substantially at a center of a passband on a logarithmic axis. When the band-pass filter $H_r(s)$ is configured by a first-order low-pass filter and a first-order high-pass filter, the band-pass filter $H_r(s)$ is expressed by the following equation (59). A time constant and a cut-off frequency are as expressed by the following equations (60) to (63). Note that "$f_{pr}$" is a torsional resonance frequency of the rear drive system 12. In addition, "$k_r$" is a coefficient determined in advance by adaptation based on experiments or simulations.

[Math. 34]

$$H_r(s) = \frac{\tau_{Hr} s}{(1 + \tau_{Hr} s) \cdot (1 + \tau_{Lr} s)} \qquad (59)$$

$$\tau_{Lr} = 1/(2\pi f_{HCr}) \qquad (60)$$

$$f_{HCr} = k_r \cdot f_{pr} \qquad (61)$$

$$\tau_{Hr} = 1/(2\pi f_{LCr}) \qquad (62)$$

$$f_{LCr} = f_{pr}/k_r \qquad (63)$$

<Effects>

Hereinafter, effects of the electric vehicle 100 according to the present embodiment configured as described above will be described in comparison with a comparative example. Here, as an example, a scene in which the stop control S13 is executed on an uphill road having a certain gradient and a low friction of a road surface will be described. The comparative example is an example that estimates a disturbance torque (vehicle disturbance torque $T_d$) in which an error caused by inputs of the front motor torque $T_{mf}$ and the rear motor torque $T_{mr}$ mutually acting like disturbances on the rear wheels 32 and the front wheels 22, respectively, is reduced, and executes the stop control S13 based on the estimated disturbance torque. In the comparative example, the distribution ratio of the driving force to the front wheels 22 and the rear wheels 32 is a predetermined fixed value (here, 1:1).

Figure 12:
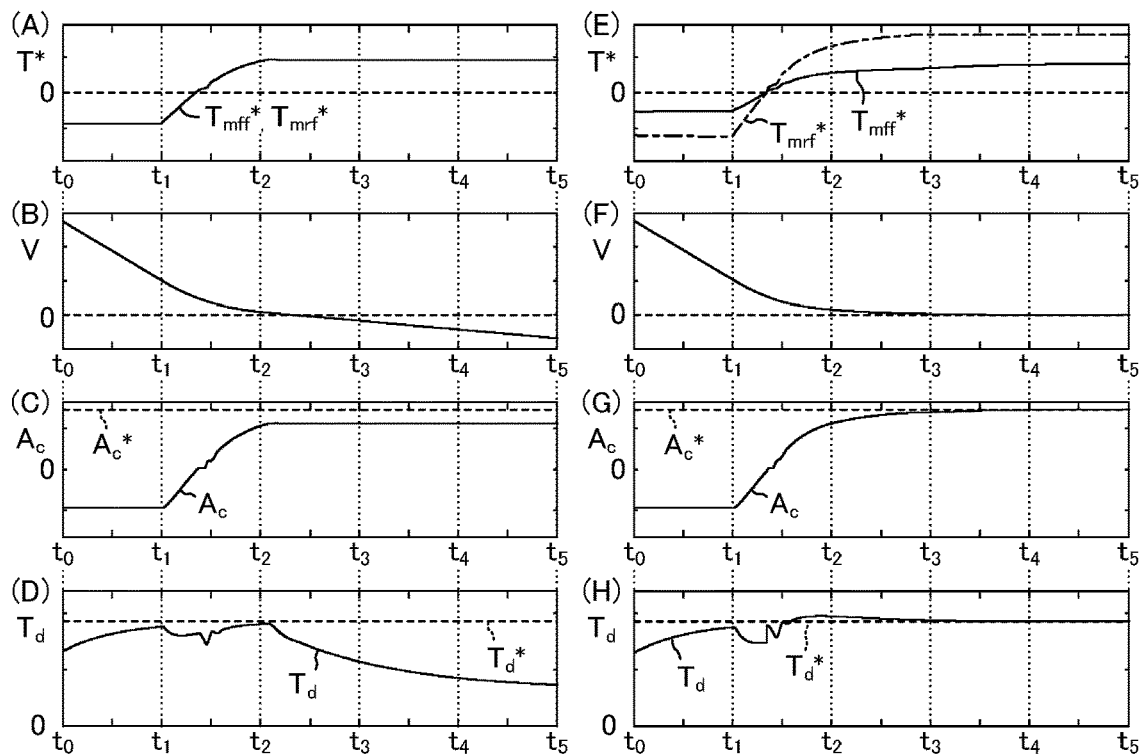
FIG. 12 is a time chart showing transitions of a torque command value, a vehicle body speed, a longitudinal acceleration, and a disturbance torque in control according to a comparative example and an embodiment.

FIG. 12 is a time chart showing transitions of the torque command value T*, the vehicle body speed V, the longitudinal acceleration $A_c$, and the disturbance torque $T_d$ in control according to the comparative example and the present embodiment. In FIG. 12, (A) to (D) show transitions of the torque command value T*, the vehicle body speed V, the longitudinal acceleration $A_c$, and the disturbance torque $T_d$ in the comparative example, respectively. In FIG. 12, (E) to (H) show transitions of the torque command value T* (front final torque command value $T_{mff}^*$, and the rear final torque command value $T_{mrf}^*$), the vehicle body speed V, the longitudinal acceleration $A_c$, and the disturbance torque $T_d$ (vehicle disturbance torque) in the present embodiment, respectively. The "$A_c^*$" in (C) and (G) in FIG. 12 is the longitudinal acceleration that balances the road surface gradient. The "Ta*" in (D) and (H) in FIG. 12 is a disturbance torque due to the road surface gradient. The time $t_1$ in (A) to (H) in FIG. 12 is a time at which it is determined that the vehicle is just before stop and the stop control S13 is started. It is also assumed that a slip occurs between the time $t_1$ and the time $t_2$ due to a change in the wheel loads of the front wheels 22 and the rear wheels 32.

As shown in (A) to (H) in FIG. 12, when the stop control S13 is started at the time $t_1$ according to deceleration from the time to, the vehicle body speed V gradually changes toward substantially zero at a time $t_3$ by the stop control S13 as shown in (B) and (F) in FIG. 12. Then, as shown in (D) and (H) in FIG. 12, in both the control of the present embodiment and the control of the comparative example, the estimated vehicle disturbance torque $T_d$ substantially approaches the disturbance torque $T_d^*$ according to the road surface gradient at the time $t_2$.

At this time, in the control of the comparative example, as shown in (D) of FIG. 12, when a slip occurs due to a change in the wheel loads of the front wheels 22 and the rear wheels 32, after the time $t_2$, the estimated vehicle disturbance torque $T_d$ deviates from the actual disturbance torque $T_d^*$ according to the road surface gradient. Therefore, in the control of the comparative example, as shown in (C) in FIG. 12, after the stop control S13 is started, the longitudinal acceleration $A_c$ does not reach the longitudinal acceleration $A_c^*$ that balances the road surface gradient. As a result, as shown in (B) in FIG. 12, in the control of the comparative example, after the electric vehicle 100 temporarily stops, the electric vehicle 100 cannot maintain the stop state and moves down.

On the other hand, in the control of the present embodiment, as shown in (H) of FIG. 12, when a slip occurs due to a change in the wheel loads of the front wheels 22 and the rear wheels 32, the actual state of the vehicle disturbance torque $T_d$ is switched to the driving wheel disturbance torque estimated for the driving wheels that are not slipping. Therefore, even after the time $t_2$, the accuracy of the estimated vehicle disturbance torque $T_d$ is maintained, and the vehicle disturbance torque $T_d$ gradually approaches the actual disturbance torque $T_d^*$ according to the road surface gradient. As shown in (E) in FIG. 12, appropriate driving forces are distributed to the front wheels 22 and the rear wheels 32 in accordance with the change in the wheel loads of the front wheels 22 and the rear wheels 32 or the like. Therefore, in the control of the present embodiment, as shown in (G) of FIG. 12, after the stop control S13 is started, the longitudinal acceleration $A_c$ gradually approaches the longitudinal acceleration $A_c^*$ which balances the road surface gradient. Then, as shown in (F) in FIG. 12, the electric vehicle 100 is stopped by the stop control S13 and can maintain the stop state.

In the above embodiment, the electric vehicle 100 including the front drive system 11 and the rear drive system 12 and having the front wheels 22 and the rear wheels 32 as driving wheels has been described as an example, but the present invention can also be suitably implemented in an electric vehicle of a different form. In each of the following modifications, configurations of electric vehicles of other forms in which the present invention can be suitably implemented will be described. However, in each of the modifications, the same reference numerals are given to the same configurations as those of the above-described embodiment or the other modifications, and the description thereof will be omitted. In each of the modifications, a specific control mode based on the vehicle disturbance torque $T_d$ is the same as that of the embodiment described above.

[First Modification]

Figure 13:
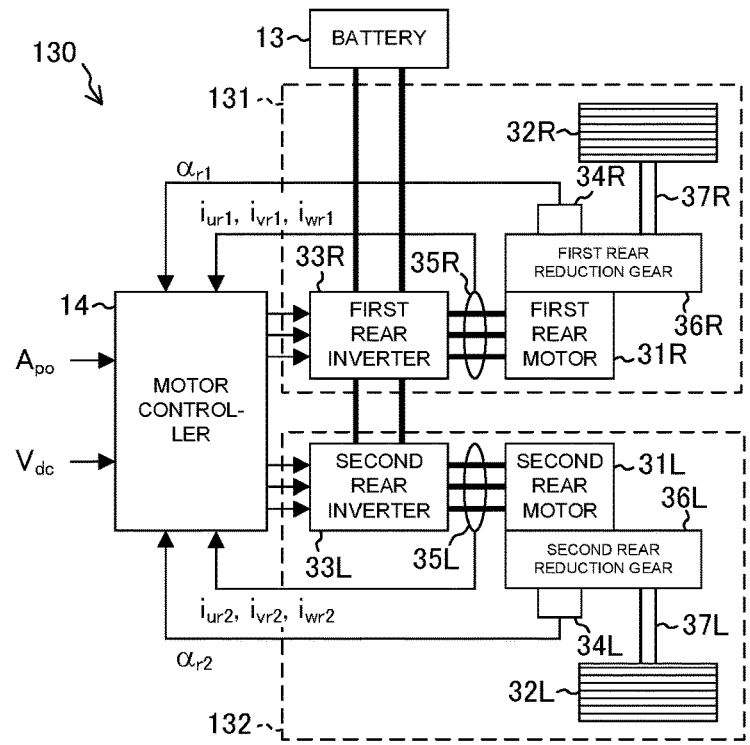
FIG. 13 is a block diagram showing a configuration of an electric vehicle according to a first modification.

FIG. 13 is a block diagram showing a configuration of an electric vehicle 130 according to a first modification. The electric vehicle 130 includes a right rear wheel drive system 131 that drives a right rear wheel 32R by a first rear motor 31R, and a left rear wheel drive system 132 that drives a left rear wheel 32L by a second rear motor 31L. That is, the electric vehicle 130 includes the right rear wheel 32R and the left rear wheel 32L that are driving wheels that are driven independently of each other, and the first rear motor 31R and the second rear motor 31L that generate a driving force on the respective driving wheels.

The right rear wheel drive system 131 includes a first rear inverter 33R, a rotation sensor 34R, a current sensor 35R, a first rear reduction gear 36R, and a drive shaft 37R in addition to the right rear wheel 32R and the first rear motor 31R. The left rear wheel drive system 132 includes a second rear inverter 33L, a rotation sensor 34R, a current sensor 35R, a second rear reduction gear 36L, and a drive shaft 37L in addition to the left rear wheel 32L and the second rear motor 31L. Functions and the like of these configurations are similar to the functions and the like of the corresponding configurations of the front drive system 11 or the rear drive system 12 of the above-described embodiment. Accordingly, the motor controller 14 can execute the same control as in the above-described embodiment for the right rear wheel drive system 131 and the left rear wheel drive system 132 by using currents $i_{ur1}$, $i_{vr1}$, $i_{wr1}$ of three phases and a rotor phase $\alpha_{r1}$ of the first rear motor 31R, and currents $i_{ur2}$, $i_{vr2}$, $i_{wr2}$ of three phases and a rotor phase $\alpha_{r2}$ of the second rear motor 31L, and the like.

Note that in the first modification, the electric vehicle 130 having the right rear wheel 32R and the left rear wheel 32L as driving wheels has been described, but the present invention can also be suitably implemented in an electric vehicle in which a right front wheel and a right rear wheel are used as driving wheels.

[Second Modification]

Figure 14:
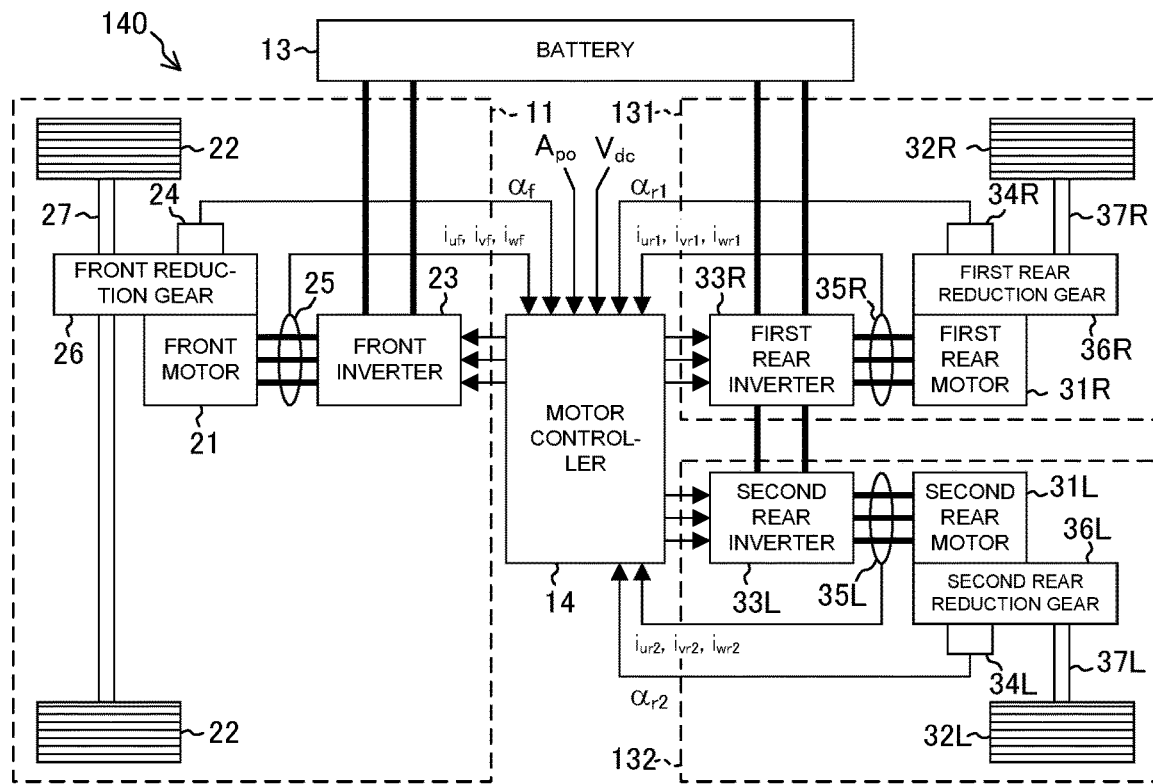
FIG. 14 is a block diagram showing a configuration of an electric vehicle according to a second modification.

FIG. 14 is a block diagram showing a configuration of an electric vehicle 140 according to a second modification. As shown in FIG. 14, the electric vehicle 140 has the front wheels 22, the right rear wheel 32R, and the left rear wheel 32L as driving wheels. The configuration of the front drive system 11 that drives the front wheels 22 is the same as that of the above-described embodiment. The configuration of the right rear wheel drive system 131 that drives the right rear wheel 32R and the configuration of the left rear wheel drive system 132 that drives the left rear wheel 32L are the same as those in the first modification.

In the electric vehicle 140, the motor controller 14 can execute the same control as in the above embodiment by using currents of three phases and a rotor phase of each of the front motor 21, the first rear motor 31R, and the second rear motor 31L. Specifically, the motor controller 14 can execute the same control as in the above embodiment by calculating a driving wheel disturbance torque for each of the front wheels 22, the right rear wheel 32R, and the left rear wheel 32L, and setting the minimum value or the maximum value thereof to the vehicle disturbance torque $T_d$ according to the equation (44).

Note that here, the electric vehicle 140 in which the front wheels 22, the right rear wheel 32R, and the left rear wheel 32L are driving wheels has been described as an example, but the present invention can also be suitably implemented in an electric vehicle in which a right front wheel 22R, a left front wheel 22L, and the rear wheels 32 are used as driving wheels.

[Third Modification]

Figure 15:
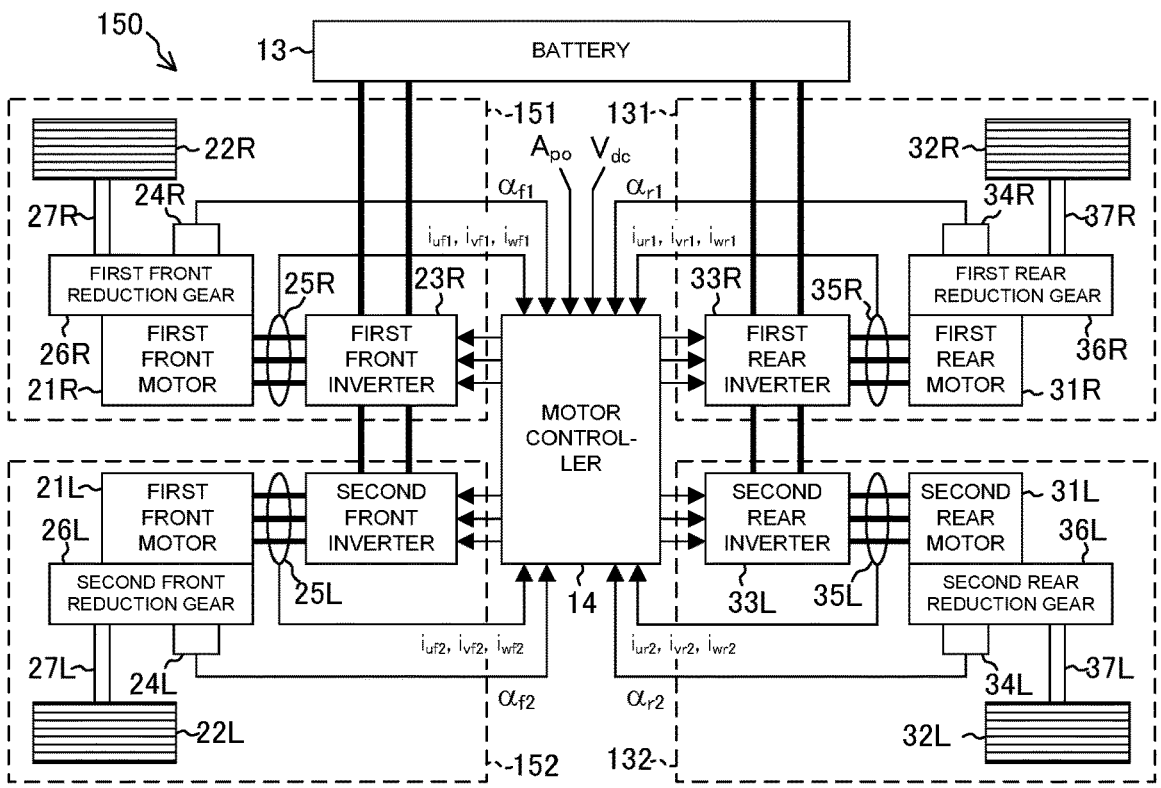
FIG. 15 is a block diagram showing a configuration of an electric vehicle according to a third modification.

FIG. 15 is a block diagram showing a configuration of an electric vehicle 150 according to a third modification. As shown in FIG. 15, the electric vehicle 150 has the right front wheel 22R, the left front wheel 22L, the right rear wheel 32R, and the left rear wheel 32L as driving wheels. Therefore, the electric vehicle 150 includes a right front wheel drive system 151, a left front wheel drive system 152, the right rear wheel drive system 131, and the left rear wheel drive system 132.

The right front wheel drive system 151 drives the right front wheel 22R by the first front motor 21R. The right front wheel drive system 151 includes a first front inverter 23R, a rotation sensor 24R, a current sensor 25R, a first front reduction gear 26R, and a drive shaft 27R in addition to the right front wheel 22R and the first front motor 21R. The left front wheel drive system 152 drives the left front wheel 22L by the second front motor 21L. The left front wheel drive system 152 includes a second front inverter 23L, a rotation sensor 24L, a current sensor 25L, a first front reduction gear 26L, and a drive shaft 27L in addition to the left front wheel 22L and the second front motor 21L. Functions and the like of these configurations are similar to the functions and the like of the corresponding configurations of the front drive system 11 or the rear drive system 12 of the above-described embodiment. Currents $i_{uf1}$, $i_{vf1}$, $i_{wf1}$ of three phases and a rotor phase $\alpha_{f1}$ of the first front motor 21R, and currents $i_{uf2}$, $i_{vf2}$, $i_{wf2}$ of three phases and the rotor phase $\alpha_{f2}$ of the second front motor 21L are input to the motor controller 14. The right rear wheel drive system 131 and the left rear wheel drive system 132 have the same configurations as those of the first modification and the second modification.

In the electric vehicle 150, the motor controller 14 can execute the same control as in the above embodiment by using currents of three phases and a rotor phase of each of the first front motor 21R, the second front motor 21L, the first rear motor 31R, and the second rear motor 31L. Specifically, the motor controller 14 can execute the same control as in the above embodiment by calculating a driving wheel disturbance torque for each of the right front wheel 22R, the left front wheel 22L, the right rear wheel 32R, and the left rear wheel 32L, and setting the minimum value or the maximum value thereof to the vehicle disturbance torque $T_d$ according to the equation (44).

Note that the electric vehicle 150 in which each of the right front wheel 22R, the left front wheel 22L, the right rear wheel 32R, and the left rear wheel 32L is a driving wheel has been described here as an example, but the present invention can be suitably implemented in an electric vehicle having five or more driving wheels.

In the above embodiment and modifications, the stop control S13 is performed while adjusting the distribution ratio $K_{f3}$ based on the vehicle disturbance torque $T_d$, but it is an example of a specific usage form of the vehicle disturbance torque $T_d$. Therefore, the vehicle disturbance torque $T_d$ estimated in the above embodiment and the modifications can be used only for adjustment of the distribution ratio $K_{f3}$ without being used for the stop control S13 (calculation of the second torque target value $T_{m2}^*$). The vehicle disturbance torque $T_d$ estimated in the above embodiment and the modifications can be used only for the stop control S13 (calculation of the second torque target value $T_{m2}^*$) without being used for adjustment of the distribution ratio $K_{f3}$. Further, the vehicle disturbance torque $T_d$ estimated in the above embodiment and the modifications can also be used for control other than the adjustment of the distribution ratio $K_{f3}$ and the stop control S13 (calculation of the second torque target value $T_{m2}^*$).

The configuration for executing the vibration damping control S14 in the embodiment and the modifications is an example. The vibration damping control S14 may be executed by feedforward control and feedback control different from those of the feedforward compensator 91 and the feedback compensator 92 described in the above embodiment and the like.

As described above, the method for controlling an electric vehicle according to the above embodiment, the modifications, and the like is a method for controlling an electric vehicle (for example, the electric vehicle 100) including a plurality of driving wheels (for example, the front wheels 22 and the rear wheels 32) and a plurality of electric motors (for example, the front motor 21 and the rear motor 31) that generate a driving force in each of the plurality of driving wheels. In this method for controlling, the vehicle body speed (for example, the first estimated vehicle body speed $V_f\hat{}$ and the second estimated vehicle body speed $V_r\hat{}$) is estimated for each driving wheel based on a rotation speed (for example, the rotation angular velocity $\omega_{mf}$ and $\omega_{mv}$) of the electric motor. A driving wheel disturbance torque (for example, the first driving wheel disturbance torque $T_{df}$ and the second driving wheel disturbance torque $T_{dr}$), which is a disturbance torque acting on the driving wheels, is estimated for each driving wheel based on the vehicle body speed estimated for each driving wheel. Then, the vehicle disturbance torque $T_d$, which is a real disturbance torque acting on the entire electric vehicle, is estimated based on the driving wheel disturbance torque estimated for each driving wheel, and a torque to be output by each of the plurality of electric motors is controlled based on the vehicle disturbance torque.

Therefore, by estimating the disturbance torque (driving wheel disturbance torque) for each driving wheel and estimating the real disturbance torque (vehicle disturbance torque $T_d$) based on these disturbance torques, the real disturbance torque can be accurately estimated regardless of any change in the wheel loads of the driving wheels or the like. Therefore, by controlling the output torque of each electric motor based on the vehicle disturbance torque $T_d$ accurately estimated as described above, the electric vehicle is accurately controlled regardless of any change in the wheel loads of the driving wheels or the like.

In the above embodiment and the modifications, the total torque $T_m^*$, which is the sum of the torques to be output by the plurality of driving wheels (for example, the front final torque command value $T_{mff}^*$ and the rear final torque command value $T_{mrf}^*$), is calculated. Then, the driving wheel disturbance torque and the vehicle disturbance torque $T_d$ are calculated based on the total torque $T_m^*$.

By calculating the driving wheel disturbance torque and the vehicle disturbance torque $T_d$ based on the total torque $T_m^*$ in this way, the driving wheel disturbance torque and the vehicle disturbance torque $T_d$ are estimated particularly accurately. More specifically, the driving wheel disturbance torque is accurately calculated based on the total torque $T_m^*$. Then, by using the total torque $T_m^*$ and the accurate driving wheel disturbance torque, the vehicle disturbance torque $T_d$ particularly accurately represents the real disturbance torque. Therefore, by calculating the driving wheel disturbance torque and the vehicle disturbance torque $T_d$ based on the total torque $T_m^*$, the electric vehicle is controlled particularly accurately regardless of any change in the wheel loads of the driving wheels or the like.

In the embodiment, the modifications, and the like, the vehicle torque, which is the torque corresponding to the driving force to be exerted by the entire electric vehicle, is estimated for each driving wheel based on the vehicle body speed estimated for each driving wheel (for example, the first estimated vehicle body speed $V_f\hat{}$ and the second estimated vehicle body speed $V_r\hat{}$). For example, the first estimated torque $T_{m1}\hat{}$ and the third estimated torque $T_{m3}\hat{}$ are acquired. The vehicle torque is calculated based on the total torque $T_m^*$. For example, the second estimated torque $T_{m2}\hat{}$ is acquired. Then, the driving wheel disturbance torque (the first driving wheel disturbance torque $T_{df}$ and the second driving wheel disturbance torque $T_{dr}$) is estimated based on the deviation between the vehicle torque (the first estimated torque $T_{m1}\hat{}$ and the third estimated torque $T_{m3}\hat{}$) estimated based on the vehicle body speed and the vehicle torque (the second estimated torque $T_{m2}\hat{}$) estimated based on the total torque $T_m^*$.

In this way, by calculating the driving wheel disturbance torque based on the deviation between the vehicle torque estimated based on the vehicle body speed and the vehicle torque estimated based on the total torque $T_m^*$, a particularly accurate driving wheel disturbance torque is estimated for each driving wheel. As a result, the estimation accuracy of the vehicle disturbance torque $T_d$ is also improved. Accordingly, as described above, the electric vehicle is particularly accurately controlled regardless of any change in the wheel loads of the driving wheels or the like by calculating the driving wheel disturbance torque based on the deviation between the vehicle torque estimated based on the vehicle body speed and the vehicle torque estimated based on the total torque $T_m^*$.

In the embodiment, the modifications, and the like, when the total torque $T_m^*$ is zero or positive, it is estimated that the maximum value of the driving wheel disturbance torque estimated for each driving wheel is the vehicle disturbance torque $T_d$. When the total torque $T_m^*$ is negative, the minimum value of the driving wheel disturbance torque estimated for each driving wheel is estimated to be the vehicle disturbance torque $T_d$. That is, the estimation is performed as the above equation (44).

When the vehicle disturbance torque $T_d$ is estimated in this way, the driving wheel disturbance torque estimated for the driving wheel (so-called non-slip wheel) that does not slip relatively when any driving wheel slips due to a change in the wheel loads of the driving wheels becomes the vehicle disturbance torque $T_d$. Accordingly, even when there is a change in the wheel load of each driving wheel, the accuracy of the vehicle disturbance torque $T_d$ is maintained. As a result, the electric vehicle is particularly accurately controlled regardless of any change in the wheel loads of the driving wheels or the like.

In the embodiment, the modifications, and the like, in particular, the distribution ratio $K_{f3}$ of the driving force for the driving wheels is set based on the driving wheel disturbance torque (for example, the first driving wheel disturbance torque $T_{df}$ and the second driving wheel disturbance torque $T_{dr}$) and the vehicle disturbance torque $T_d$, and the torque to be output by each of the plurality of electric motors is controlled according to the distribution ratio $K_{f3}$.

As described above, by setting the distribution ratio $K_{f3}$ based on the driving wheel disturbance torque and the vehicle disturbance torque $T_d$, the driving force is appropriately distributed according to the change in the wheel loads of the driving wheels or the like. Therefore, the electric vehicle is particularly accurately controlled regardless of any change in the wheel loads of the driving wheels or the like. Setting of the distribution ratio $K_{f3}$ based on the driving wheel disturbance torque and the vehicle disturbance torque $T_d$ is particularly effective in the stop control S13 as described in the effects of the above embodiment.

In the above embodiment, the modifications, and the like, the driving wheel disturbance torque deviation $\Delta T_d$, which is the deviation of the driving wheel disturbance torques estimated for each driving wheel, is calculated. Then, the distribution ratio $K_{f3}$ is set based on the driving wheel disturbance torque deviation $\Delta T_d$ and the vehicle disturbance torque $T_d$.

In this way, by setting the distribution ratio $K_{f3}$ based on the driving wheel disturbance torque deviation $\Delta T_d$ and the vehicle disturbance torque $T_d$, when there is a change in the wheel loads of the driving wheels or the like, a particularly appropriate distribution ratio $K_{f3}$ corresponding to the change in the wheel loads of the driving wheels or the like is set. Accordingly, the electric vehicle is particularly accurately controlled regardless of any change in the wheel loads of the driving wheels or the like.

Specifically, in the above embodiment, the modifications, and the like, the first distribution ratio $K_{f1}$ is calculated based on the vehicle disturbance torque $T_d$, and the second distribution ratio $K_{f2}$ is calculated based on the driving wheel disturbance torque deviation $\Delta T_d$. Then, the final distribution ratio $K_{f3}$ is set based on the deviation between the first distribution ratio $K_{f1}$ and the second distribution ratio $K_{f2}$.

As described above, the first distribution ratio $K_{f1}$ is a basic distribution ratio in an ideal state in which there is no change in the wheel loads of the driving wheels. Then, when there is a difference between the first driving wheel disturbance torque $T_{df}$ and the second driving wheel disturbance torque $T_{dr}$, that is, when there is a change in the wheel loads of the driving wheels, the second distribution ratio $K_{f2}$ acts as a correction term or an adjustment term for the distribution ratio $K_{f1}$. Therefore, as described above, when the final distribution ratio $K_{f3}$ is set based on the deviation between the first distribution ratio $K_{f1}$ and the second distribution ratio $K_{f2}$, the particularly appropriate distribution ratio $K_{f3}$ is set in accordance with the change in the wheel loads of the driving wheels or the like. As a result, the electric vehicle is particularly accurately controlled regardless of any change in the wheel loads of the driving wheels or the like.

In the embodiment, the modifications, and the like, the estimated vehicle disturbance torque $T_d$ is used in the stop control S13. Specifically, the vehicle body speed feedback torque $T_\omega$ is calculated based on the estimated vehicle body speed (the first estimated vehicle body speed $V_f\hat{}$ and the second estimated vehicle body speed $V_r\hat{}$). Then, based on the vehicle disturbance torque $T_d$ and the vehicle body speed feedback torque $T_\omega$, a torque target value (the second torque target value $T_{m2}^*$) that converges to the vehicle disturbance torque $T_d$ along with a decrease in the vehicle body speed is calculated. Then, based on the torque target value (the second torque target value $T_{m2}^*$), it is determined whether the electric vehicle is just before stop. Then, when it is determined that the electric vehicle is just before stop, the torque output by the electric motor (the front motor torque $T_{mf}$ and the rear motor torque $T_{mr}$) is controlled to converge to a torque obtained by distributing the second torque target value $T_{m2}^*$ according to the distribution ratio $K_{f3}$.

In this way, by using the estimated vehicle disturbance torque $T_d$ in the stop control S13, the electric vehicle can be stopped and the stop state can be maintained even when there is a change in the wheel loads of the driving wheels or the like. That is, the electric vehicle is particularly accurately controlled to stop regardless of any change in the wheel loads of the driving wheels or the like.

Although the embodiments of the present invention have been described above, the configurations described in the above embodiment, modifications, and the like are merely examples of applications of the present invention, and are not intended to limit the technical scope of the invention.

For example, as a specific estimation method of the first estimated vehicle body speed $V_f\hat{}$ and the second estimated vehicle body speed $V_r\hat{}$ by the vehicle body speed estimation unit 51, a method other than the method described in the above embodiment can be adopted. The selector 77 used in the disturbance torque estimation unit 52 can set the vehicle disturbance torque $T_d$ based on the first driving wheel disturbance torque $T_{df}$ and the second driving wheel disturbance torque $T_{dr}$ by calculation or the like different from the calculation described in the above embodiment. Similarly, the distribution ratio calculation unit 78 used in the disturbance torque estimation unit 52 can set the distribution ratio $K_{f3}$ based on the first driving wheel disturbance torque $T_{df}$, the second driving wheel disturbance torque $T_{dr}$, and the vehicle disturbance torque $T_d$ by calculation or the like different from the calculation described in the above embodiment. The same applies to other configurations, calculations, and the like, such as the configurations related to the vibration damping control S14.

The invention claimed is:
1. A method for controlling an electric vehicle including a plurality of driving wheels and a plurality of electric motors that generate driving forces respectively for the plurality of driving wheels, the method comprising:

estimating a vehicle body speed for each of the driving wheels based on a rotation speed of each of the electric motors;

estimating, for each of the driving wheels, a driving wheel disturbance torque, which is a disturbance torque acting on the driving wheel, based on the vehicle body speed estimated for each of the driving wheels;

estimating a vehicle disturbance torque, which is an actual disturbance torque acting on the entire electric vehicle, based on the driving wheel disturbance torque estimated for each of the driving wheels; and controlling a torque to be output by each of the plurality of electric motors based on the vehicle disturbance torque.

2. The method for controlling an electric vehicle according to claim 1, wherein a total torque, which is a sum of torques to be output by the plurality of driving wheels, is calculated, and the driving wheel disturbance torque and the vehicle disturbance torque are estimated based on the total torque.

3. The method for controlling an electric vehicle according to claim 2, wherein a vehicle torque, which is a torque corresponding to a driving force to be exerted by the entire electric vehicle, is estimated for each of the driving wheels based on the vehicle body speed estimated for each of the driving wheels, the vehicle torque is estimated based on the total torque, and the driving wheel disturbance torque is estimated based on a deviation between the vehicle torque estimated based on the vehicle body speed and the vehicle torque estimated based on the total torque.

4. The method for controlling an electric vehicle according to claim 2, wherein when the total torque is zero or positive, a maximum value of the driving wheel disturbance torque estimated for each of the driving wheels is estimated as the vehicle disturbance torque, and when the total torque is negative, a minimum value of the driving wheel disturbance torque estimated for each of the driving wheels is estimated as the vehicle disturbance torque.

5. The method for controlling an electric vehicle according to claim 1, wherein a distribution ratio of the driving force to each of the driving wheels is set based on the driving wheel disturbance torque and the vehicle disturbance torque, and the torque to be output by each of the plurality of electric motors is controlled according to the distribution ratio.

6. The method for controlling an electric vehicle according to claim 5, wherein a driving wheel disturbance torque deviation, which is a deviation of the driving wheel disturbance torques estimated for each of the driving wheels, is calculated, and the distribution ratio is set based on the driving wheel disturbance torque deviation and the vehicle disturbance torque.

7. The method for controlling an electric vehicle according to claim 6, wherein a first distribution ratio is calculated based on the vehicle disturbance torque, a second distribution ratio is calculated based on the driving wheel disturbance torque deviation, and the distribution ratio is set based on a deviation between the first distribution ratio and the second distribution ratio.

8. The method for controlling an electric vehicle according to claim 6, wherein a vehicle body speed feedback torque is calculated based on the vehicle body speed, a torque target value that converges to the vehicle disturbance torque along with a decrease in the vehicle body speed is calculated based on the vehicle disturbance torque and the vehicle body speed feedback torque, whether the electric vehicle is just before stop is determined based on the torque target value, and when it is determined that the electric vehicle is just before stop, the torque to be output by the electric motor is converged to a torque obtained by distributing the torque target value according to the distribution ratio.

9. A device for controlling an electric vehicle including a plurality of driving wheels and a plurality of electric motors that generate driving forces respectively for the plurality of driving wheels, the device comprising:

a vehicle body speed estimation unit configured to estimate a vehicle body speed for each of the driving wheels based on a rotation speed of each of the electric motors;

a driving wheel disturbance torque estimation unit configured to estimate, for each of the driving wheels, a driving wheel disturbance torque, which is a disturbance torque acting on the driving wheel, based on the vehicle body speed estimated for each of the driving wheels; and a vehicle disturbance torque estimation unit configured to estimate a vehicle disturbance torque, which is an actual disturbance torque acting on the entire electric vehicle, based on the driving wheel disturbance torque estimated for each of the driving wheels, wherein a torque to be output by each of the plurality of electric motors is controlled based on the vehicle disturbance torque.

* * * * *